(12) United States Patent
    Sandiford

(10) Patent No.: US 10,829,228 B2
(45) Date of Patent: Nov. 10, 2020

(54) FLUID STRAIGHTENING CONNECTION UNIT

(71) Applicant: ITT MANUFACTURING ENTERPRISES, LLC, Wilmington, DE (US)

(72) Inventor: A. David Sandiford, Lake Hughes, CA (US)

(73) Assignee: ITT Manufacturing Enterprises, LLC, Wilmington, DE (US)

( * ) Notice: Subject to any disclaimer, the term of this patent is extended or adjusted under 35 U.S.C. 154(b) by 615 days.

(21) Appl. No.: 15/408,309

(22) Filed: Jan. 17, 2017

(65) Prior Publication Data

US 2018/0201378 A1     Jul. 19, 2018

(51) Int. Cl.
| | |
|---|---|
| *F04D 29/54* | (2006.01) |
| *F15D 1/00* | (2006.01) |
| *F24F 13/08* | (2006.01) |
| *F15D 1/02* | (2006.01) |
| *B64D 13/08* | (2006.01) |

(Continued)

(52) U.S. Cl.
CPC ........... *B64D 13/08* (2013.01); *F04D 19/002* (2013.01); *F04D 29/541* (2013.01); *F04D 29/547* (2013.01); *F15D 1/001* (2013.01); *F24F 13/08* (2013.01); *B64D 2013/0644* (2013.01); *F15D 1/025* (2013.01)

(58) Field of Classification Search
CPC ........... B64D 13/08; B64D 2013/0644; F04D 19/002; F04D 29/541; F04D 29/547; F15D 1/001; F15D 1/025; F24F 13/08; F25D 1/001; F25D 1/0025

USPC ........................................................... 454/76
See application file for complete search history.

(56) References Cited

U.S. PATENT DOCUMENTS 3,116,639 A * 1/1964 Bird ..................... G01P 5/01
                                                                73/861.24
3,561,883 A * 2/1971 Berry ..................... F04D 29/36
                                                                415/131

(Continued)

FOREIGN PATENT DOCUMENTS

| CN | 101952691 | 1/2011 |
| CN | 203177471 | 9/2013 |

(Continued)

OTHER PUBLICATIONS

Invitation to Pay Additonal Fees and, Where Applicable, Protest Fee for PCT/US2017/064674 dated Mar. 15, 2018 in 22 pages.

(Continued)

*Primary Examiner* — Edelmira Bosques
*Assistant Examiner* — Frances F. Hamilton
(74) *Attorney, Agent, or Firm* — Knobbe, Martens, Olson & Bear, LLP

(57) ABSTRACT

Various connection units are disclosed. The connection unit can be configured to straighten a flow of air, such as to reduce the distance before the flow of air becomes substantially laminar. The connection unit can include a drag reduction unit. The drag reduction unit can be configured to redirect airflow to the center of the connection unit. The connection unit can include a wake diverting component configured to lift air away from the periphery of the connection unit and/or redirect the airflow towards a radial center connection unit.

19 Claims, 21 Drawing Sheets
(3 of 21 Drawing Sheet(s) Filed in Color)

(51) Int. Cl.
*F04D 19/00* (2006.01)
*B64D 13/06* (2006.01)

(56) References Cited

U.S. PATENT DOCUMENTS

| | | | | |
|---|---|---|---|---|
| 4,437,349 A * | 3/1984 | Joy | ................. | G01F 1/3209 |
| | | | | 73/861.22 |
| 5,005,426 A * | 4/1991 | Lew | ................. | G01F 1/10 |
| | | | | 73/195 |
| 5,203,164 A * | 4/1993 | Paulson | ................. | F02K 1/34 |
| | | | | 181/213 |
| 5,292,088 A * | 3/1994 | Lemont | ................. | B63H 5/14 |
| | | | | 244/65 |
| 5,596,152 A * | 1/1997 | Bergervoet | ................. | F15D 1/0005 |
| | | | | 138/44 |
| 5,816,907 A * | 10/1998 | Crockett | ................. | B60H 1/3435 |
| | | | | 454/155 |
| 6,520,286 B1 * | 2/2003 | Frederiksen | ................. | F01N 1/08 |
| | | | | 181/256 |
| 8,672,614 B1 * | 3/2014 | Fitzpatrick | ................. | F04D 17/164 |
| | | | | 415/116 |
| 8,936,434 B2 * | 1/2015 | Peterson | ................. | F04D 25/084 |
| | | | | 415/218.1 |
| 9,032,815 B2 * | 5/2015 | Noui-Mehidi | ................. | G01F 1/42 |
| | | | | 73/861.22 |
| 9,279,706 B2 * | 3/2016 | Khalifa | ................. | G01F 1/3209 |
| 10,184,488 B2 * | 1/2019 | Brownell | ................. | F04D 29/023 |
| 10,184,489 B2 * | 1/2019 | Avedon | ................. | F24F 7/065 |
| 2003/0206800 A1 * | 11/2003 | Mathson | ................. | F04D 17/06 |
| | | | | 415/220 |
| 2008/0078340 A1 * | 4/2008 | Havel | ................. | F04D 29/544 |
| | | | | 123/41.49 |
| 2011/0275302 A1 * | 11/2011 | Tarada | ................. | F04D 29/547 |
| | | | | 454/166 |
| 2013/0306183 A1 * | 11/2013 | Sawchuk | ................. | G01F 15/00 |
| | | | | 138/44 |
| 2014/0202577 A1 * | 7/2014 | Webster, III | ................. | F16L 43/008 |
| | | | | 138/177 |
| 2015/0354841 A1 * | 12/2015 | Amr | ................. | F24F 1/0029 |
| | | | | 454/233 |
| 2017/0030375 A1 * | 2/2017 | Shibata | ................. | F04D 29/526 |
| 2017/0234330 A1 * | 8/2017 | Kelaher | ................. | F04D 29/522 |
| | | | | 415/1 |
| 2017/0370385 A1 * | 12/2017 | Reckner | ................. | G01F 25/0007 |
| 2018/0201378 A1 * | 7/2018 | Sandiford | ................. | B64D 13/08 |
| 2020/0011189 A1 * | 1/2020 | Johansson | ................. | F04D 19/028 |

FOREIGN PATENT DOCUMENTS

| | | | |
|---|---|---|---|
| CN | 204345828 | 5/2015 | |
| DE | 299 00 106 U1 | 4/1999 | |
| EP | 0035838 A1 * | 9/1981 | ........... F04D 29/681 |
| EP | 0 410 924 A2 | 1/1991 | |
| EP | 0410924 A2 * | 1/1991 | ........... F01N 3/2892 |
| EP | 2 987 462 A1 | 2/2016 | |
| JP | H 05 126360 | 5/1993 | |
| WO | WO 1998/36927 A2 | 8/1998 | |
| WO | WO 2009/041937 A1 | 4/2009 | |
| WO | WO 2012/045378 | 4/2012 | |
| WO | WO 2013/106914 | 7/2013 | |

OTHER PUBLICATIONS

International Search Report and Written Opinion for PCT/US2017/064674 dated Mar. 15, 2018 in 29 pages.
English translation of Chinese Office Action for Chinese Application No. 201780086766, dated Aug. 27, 2020.
English translation of Chinese Search Report for Chinese Application No. 2017800867668, dated Aug. 21, 2020.

* cited by examiner

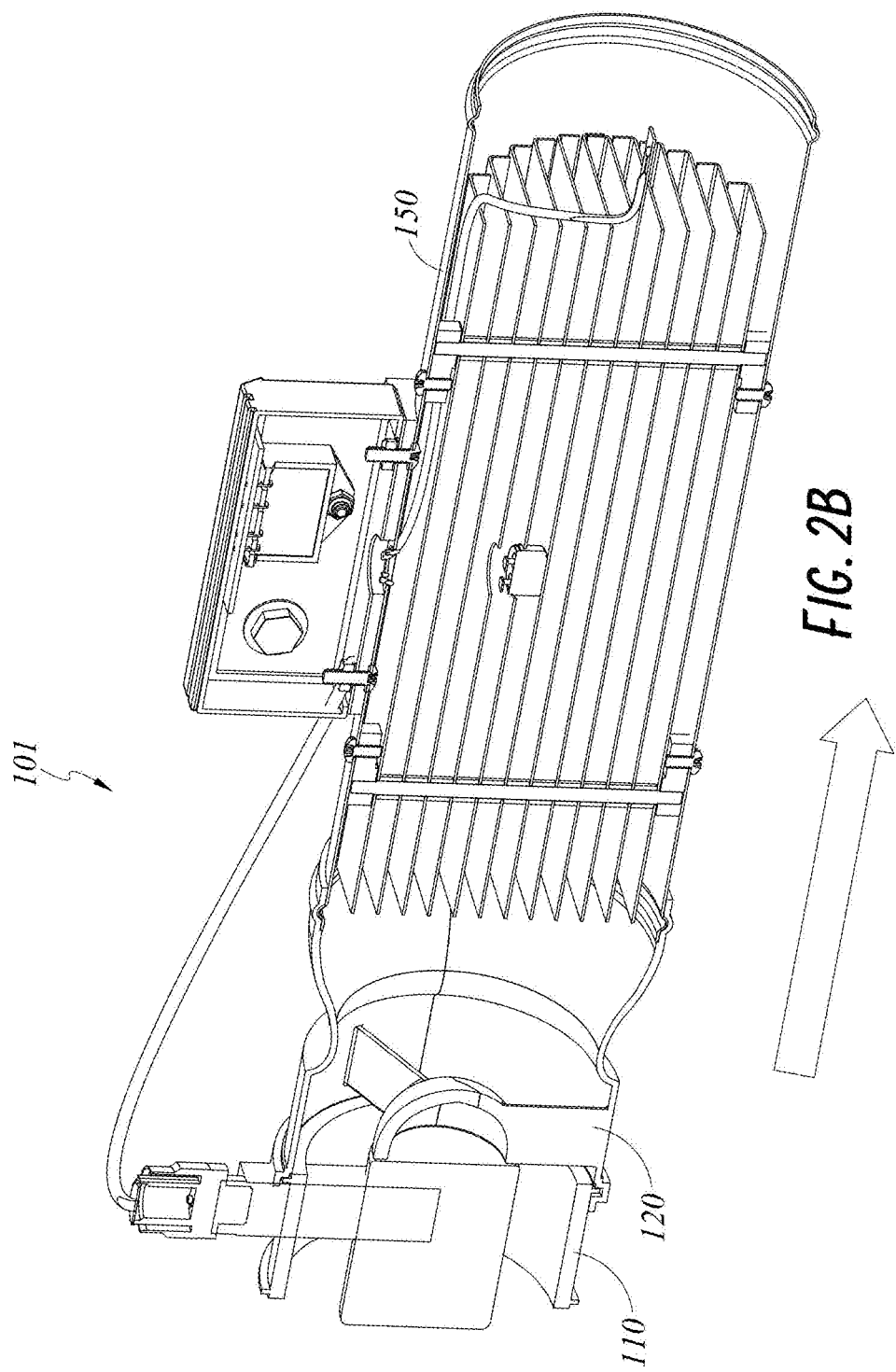

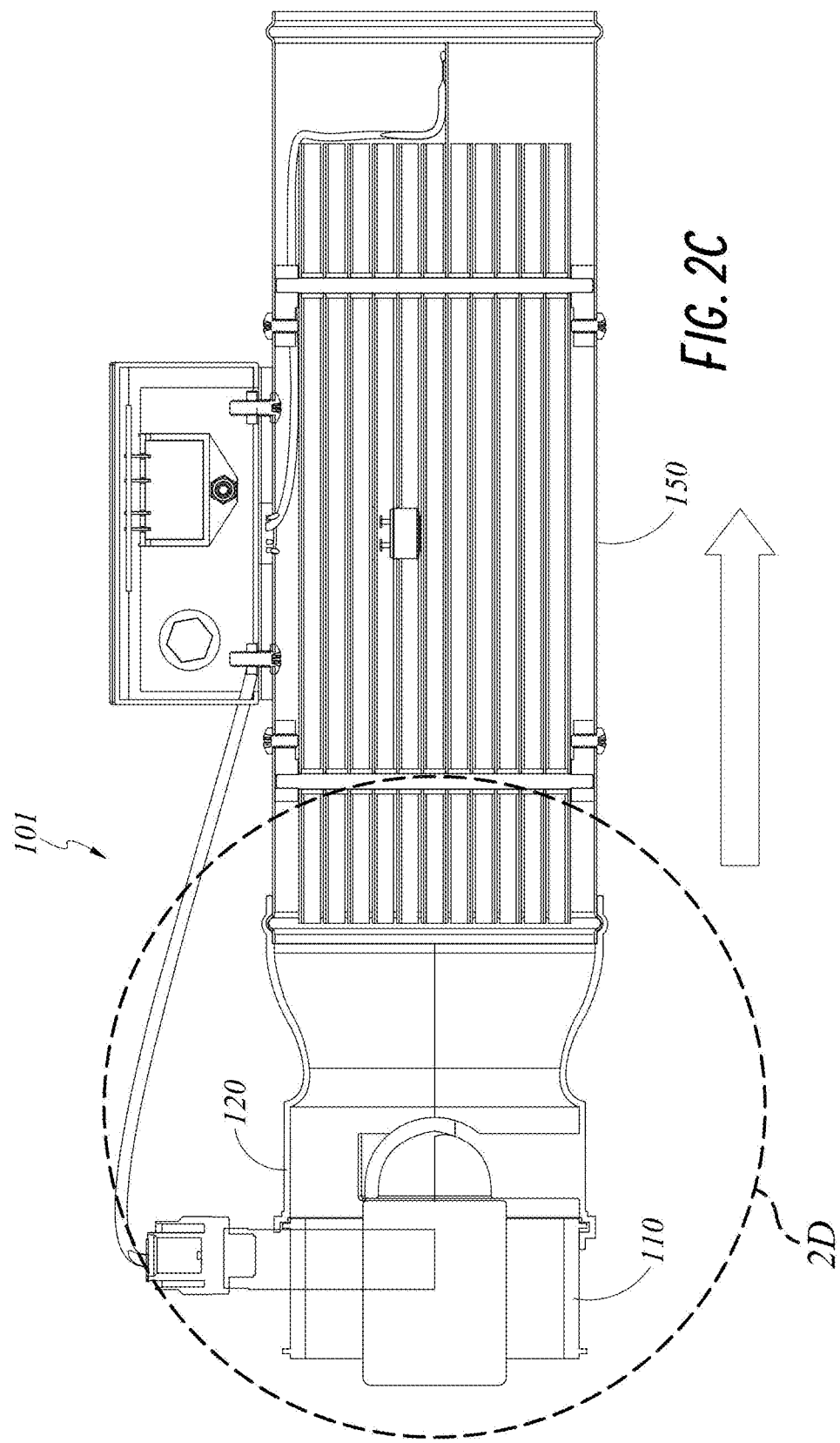

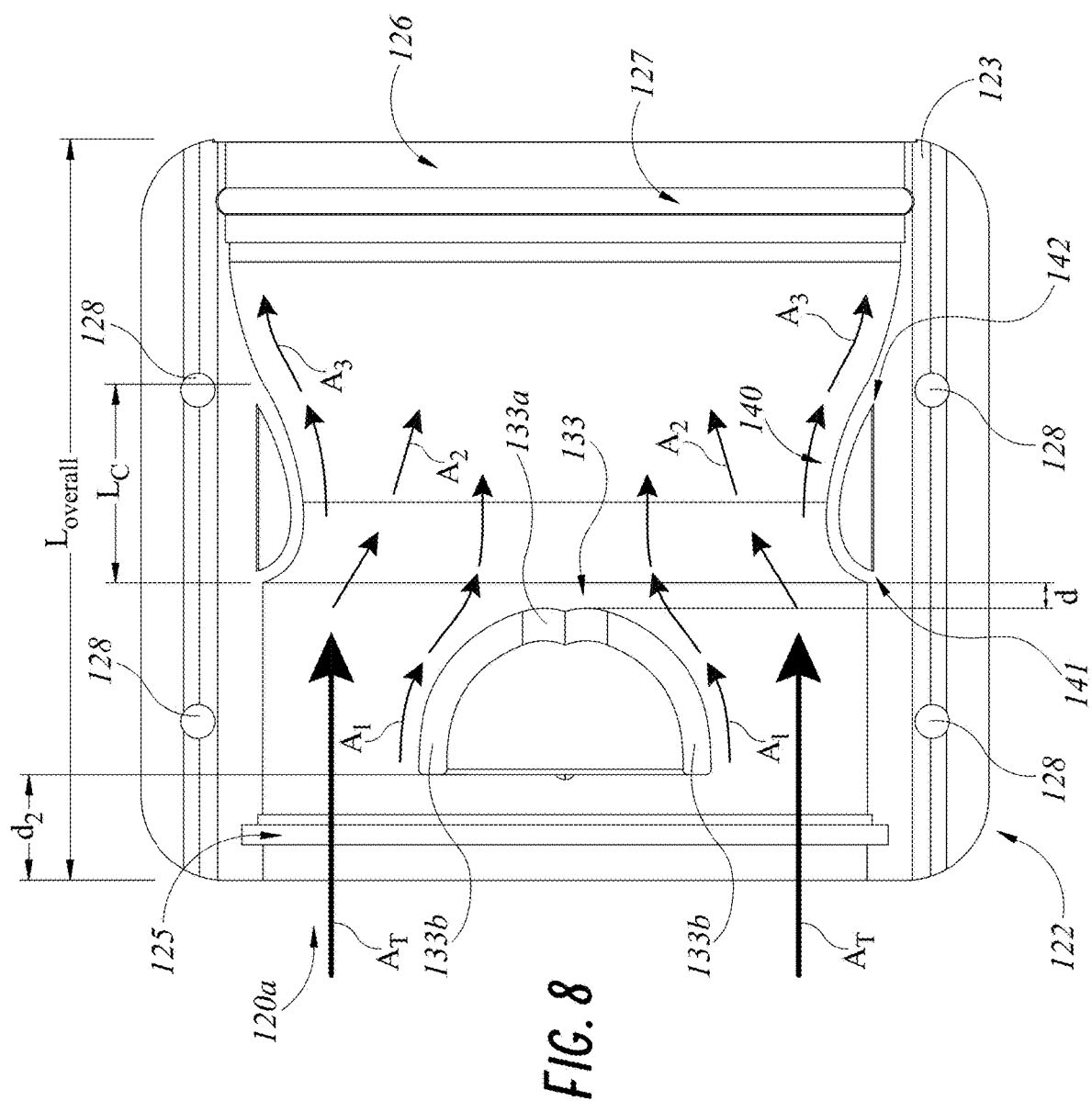

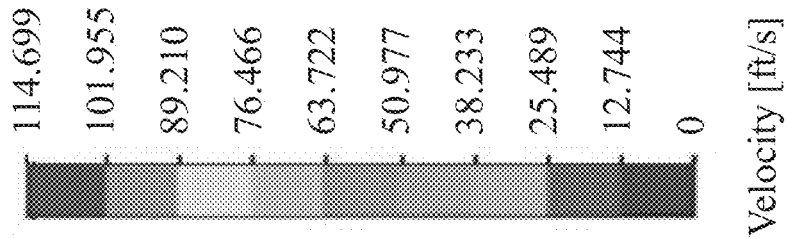

FLUID STRAIGHTENING CONNECTION UNIT

BACKGROUND

Field

This disclosure relates to a connection unit adapted to straighten a flow of fluid, such as straightening a flow of air in an environmental control system.

Certain Related Art

An environmental control system provides heated or cooled air through ducting. The environmental control system can include a fan, which can include a motor coupled with a blade arrangement. The environmental control system can include heater assembly that receives a flow of air from the fan and transfers heat to the air. The heated air can be delivered through the ducting to a conditioned space to provide a more comfortable environment.

SUMMARY OF CERTAIN FEATURES

In some situations, such as because of the size and position of the motor, the fan can obstruct and/or disturb laminar airflow through the center of the duct in which the fan is installed. For example, in the area immediately downstream of the fan, an area of reduced flow and/or eddies can occur. In some situations, approximately 18"-24" of unobstructed straight length of tubing can be needed to restore laminar flow. This can be problematic in installations in which space is at a premium, such as in many areas of airplanes.

Moreover, the irregular air flow can cause problems with the heating assembly. The heating assembly can include a series of heat transfer elements. The heat transfer elements can be affected by the quantity and quality of airflow, such as whether the flow is laminar or non-laminar. For example, in some situations, the irregular (e.g., non-laminar) airflow is insufficient to conduct enough heat from the heat transfer elements, which can lead to the elements overheating and/or being damaged. Thus, providing regular flow to the heating system can be desirable. In some embodiments, regular flow comprises laminar air flow. In some embodiments, regular flow comprises air flow that is substantially consistent in rate and/or volume across the cross-section of the flow.

Laminar airflow in a duct can have a higher velocity in the center of the tube and a lower velocity at the periphery of the duct. Therefore, positioning the fan in the center portion of the duct can impede the portion of the flow with the greatest velocity. This can reduce the system's efficiency and/or can restrict the amount of heating available from the heating system. Further, maintaining higher airflow velocity (e.g., laminar airflow) can improve heat transfer from the heating elements to the airflow, which can reduce the chance of damage to the elements and/or increase the heating capacity of the system.

In some embodiments, the heating system can include a connection unit that attaches the fan with the heater. The connection unit can be configured to straighten fluid that is flowing through and/or downstream of the connection unit. In some examples, the connection unit can be configured to alter airflow direction towards the center of the assembly. In some embodiments, the connection unit can be configured to reduce the downstream distance that is required for the flow of fluid to become substantially laminar (e.g., compared to without the connection unit).

The connection unit can be configured to straighten the fluid flow without creating a substantial aerodynamic drag or head pressure. Drag or head pressure (e.g., through obstructions, bends, etc.) can reduce the operational length of the ducting, which can reduce the length before the amount and/or rate of airflow at outlets into a conditioned space which is unacceptably low. However, in some embodiments, the drag or head pressure added by the connection unit can be small enough to avoid substantially reducing the operational length of the ducting. For example, the drag and/or head pressure added by the connection unit can be less than or equal to about: 10%, 5%, 3%, 1%, or otherwise. In some examples, the connector includes a drag reduction unit. The drag reduction unit can be configured to reduce an area of high pressure and/or dead space, such as a region immediately downstream of a motor of the fan assembly. In various embodiments, the drag reduction unit is configured to divert a portion of the airflow into such a region. The drag reduction unit can be configured to redirect the airflow towards the center of the cylindrical duct. In some embodiments, the drag reduction unit has a curved shape, such as a generally hemispherical shape. The drag reduction unit can be configured to encourage a flow of air along some or all of the curve. The component can be aligned with and/or be adjacent to the motor.

In some examples, the connector can include a wake diverter. The wake diverter can protrude from and/or form a profile in the interior surface of the connector. In some embodiments, the wake diverter has a wing-like shape that has a leading edge and a trailing edge. The leading edge can be configured to lift the relatively slow moving air at the duct periphery. In some examples, the trailing edge can be sloped downwards to reduce drag and/or divert a portion of the airflow toward the inside periphery of the duct. This can reduce the chance of the assembly and heating system being starved for airflow.

BRIEF DESCRIPTION OF THE FIGURES

This patent or application file contains at least one drawing executed in color. Copies of this patent or patent application publication with color drawing(s) will be provided by the Office upon request and payment of the necessary fee.

Various embodiments are depicted in the accompanying drawings for illustrative purposes, and should not be interpreted as limiting the scope of the embodiments. Furthermore, various features of different disclosed embodiments can be combined to form additional embodiments, which are part of this disclosure.

FIGS. 2B-2C illustrate various cross-sectional views of the environmental control system of FIG. 2A.

FIG. 8 illustrates a cross-sectional view of the connection unit of FIG. 3A with schematic illustrations of an example airflow.

FIG. 10 illustrates a legend of the CFD representation of FIGS. 9A-9D.

DETAILED DESCRIPTION CERTAIN EMBODIMENTS

Various connection unit assemblies and systems are disclosed to illustrate various examples that may be employed to achieve one or more desired improvements. For purposes of presentation, certain embodiments are disclosed with respect to heater assemblies, but the disclosed inventions can be used in other contexts as well. Indeed, the described embodiments are examples only and are not intended to restrict the general disclosure presented and the various aspects and features of this disclosure. The general principles described herein may be applied to embodiments and applications other than those discussed herein without departing from the spirit and scope of the disclosure. This disclosure should be accorded the widest scope consistent with the principles and features that are disclosed or suggested herein.

Although certain aspects, advantages, and features are described herein, it is not necessary that any particular embodiment include or achieve any or all of those aspects, advantages, and features. For example, some embodiments may not achieve the advantages described herein, but may achieve other advantages instead. No feature, component, or step is necessary or critical.

Overview

Figure 1:
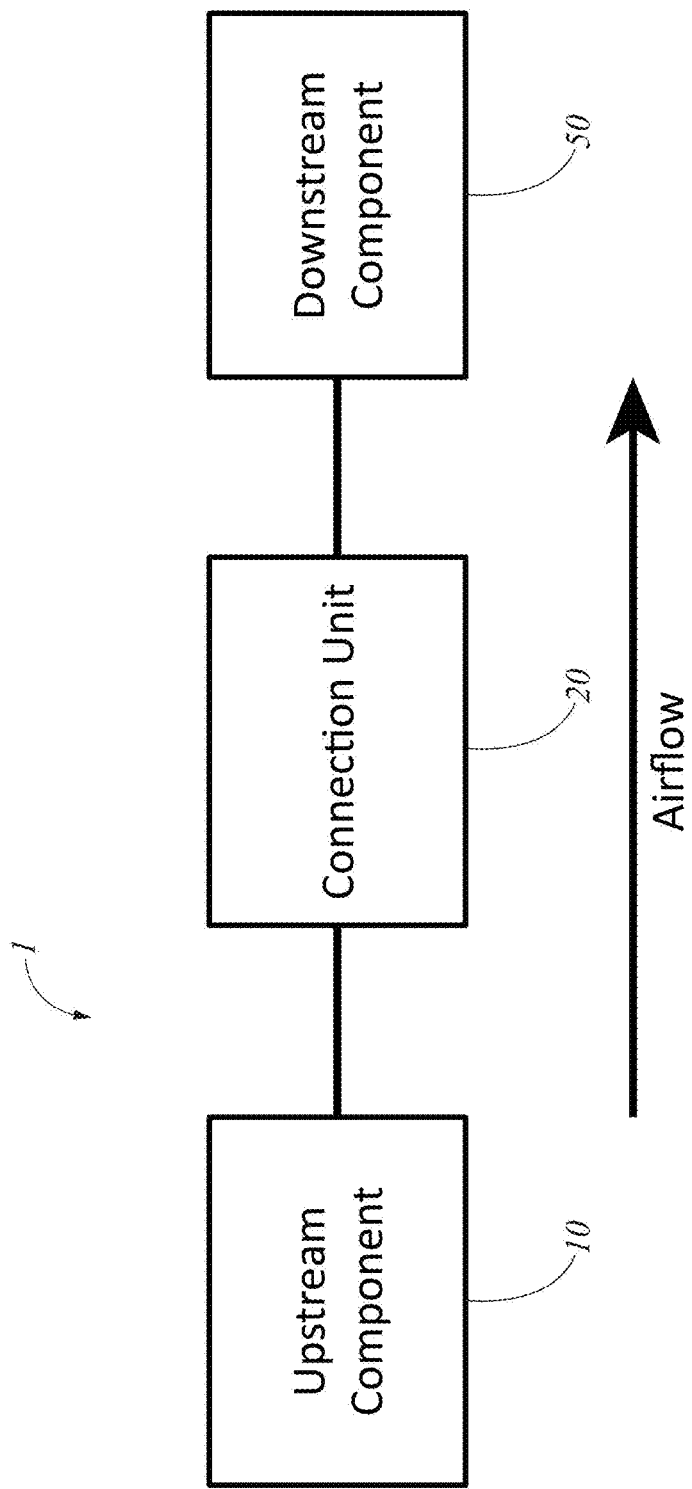
FIG. 1 illustrates a schematic embodiment of an environmental control system.

FIG. 1 illustrates a schematic drawing of an environmental control system 1. The environmental control system 1 can include an upstream component 10 and a downstream component 50 that are connected by a connection unit 20. In some examples, the upstream component 10 is a fan assembly (e.g., an axial or vaneaxial fan) and the downstream component 50 is a heater assembly (e.g., an electric heater). Although the following disclosure is discussed with regard to a heating system, as is illustrated in FIG. 1, the connection unit 20 can be used with many types of systems (e.g., cooling systems). As shown the airflow can pass through the upstream component 10, the connection unit 20, and the downstream component 50.

As will be discussed in more detail below, the connection unit 20 can alter fluid flow (e.g., airflow) to improve downstream characteristics of the flow. For example, the connection unit 20 can decrease the downstream distance before the flow becomes generally laminar. In some variants, the connection unit 20 can decrease the downstream distance before the flow volume and/or flow rate is substantially constant across the cross-sectional area of the flow. For example, in some embodiments, the connection unit 20 can be configured to divert a portion of the airflow towards a radially central portion of a downstream duct. In some embodiments the improved flow characteristics can positively affect the reliability and/or power capacity of the heater assembly. As will be also illustrated in more detail, the flow redirection afforded by the connection unit 20 can shorten the overall length of the environmental control system, which can, allow more installation options. This can be particularly beneficial in cramped areas, such as aircraft walls, floors, or overheads. Certain embodiments of the connection unit 20 can have minimal impact on airflow rate and/or quantity. For example, the change in airflow rate and/or quantity with and without the connection unit 20 can be less than or equal to about 1%.

Connection Features

Figure 2A:
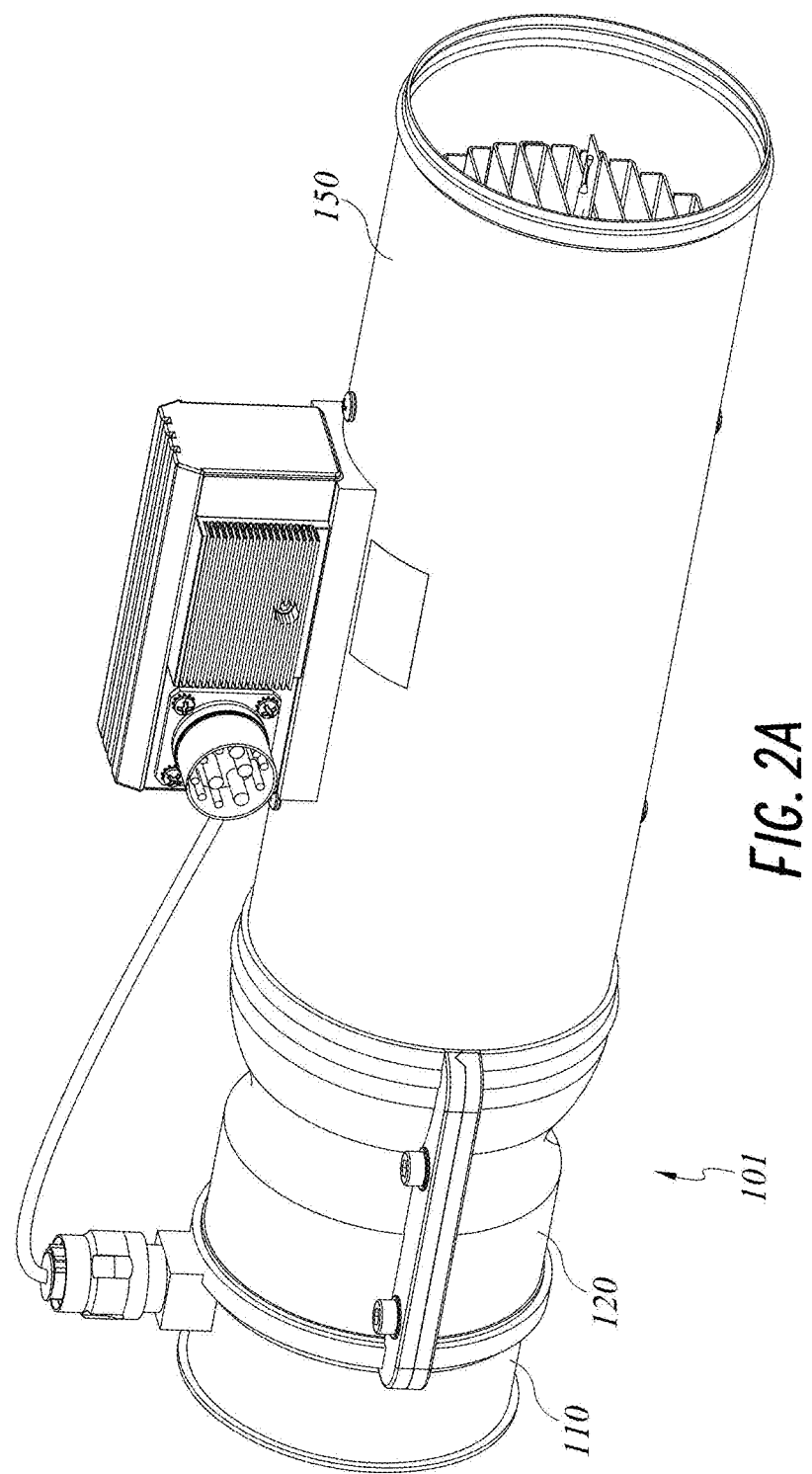
FIG. 2A illustrates a perspective view of another embodiment of an environmental control system.

FIGS. 2A-2C illustrate an example of another environmental control system 101. As shown, the upstream component 10 is a fluid movement unit, such as a fan assembly 110, and the downstream component 50 is a heat transfer unit, such as a heater assembly 150. As designated by the arrow in FIGS. 2B and 2C, air flows from the fan assembly 110 through a connection unit 120 to reach the heater assembly 150.

As shown in FIGS. 2B and 2C, the connection unit 120 can be configured to attach to the fan assembly 110 and the heater assembly 150. In some examples, such an attachment is not elastomeric. For example, some embodiments of the connection unit 120 are not made of rubber, such as at least at the regions that connect with the fan assembly 110 and/or the heater assembly 150. Certain embodiments are made of plastics, such as fire retardant nylon, PEEK, ABS, or other suitable material. In some embodiments, the secondary band clamp type fasteners (e.g., pipe clamps) on the peripheries of the assembly are not required to make the connection between the fan assembly 110 and the heater assembly 150. This can facilitate installation and/or reduce air leakage. Various manufacturing techniques are contemplated, such as manufacturing that does not require tooling and/or 3-D printing.

Figure 2D:
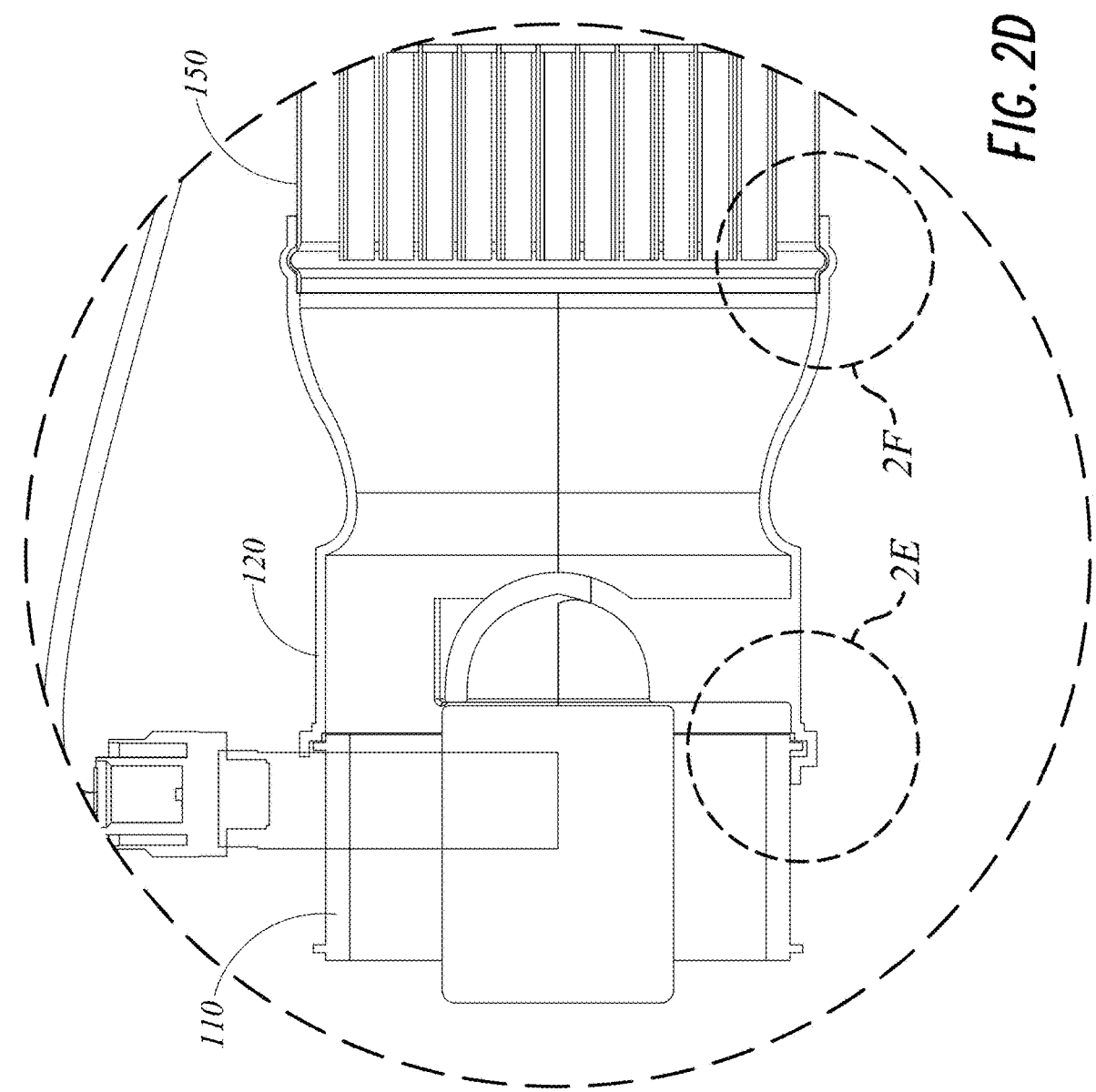
FIG. 2D illustrates an enlarged cross-sectional view of Section A-A of FIG. 2C.

In some embodiments, the connection unit 120 is configured to connect with dissimilar end configurations of the fan assembly 110 and the connection unit 120. For example, the end of the fan assembly 110 can be a different shape and/or size compared to the end of the heater assembly 150. An example of dissimilar end configurations is shown in FIG. 2D, which illustrates an enlarged view of the connection unit 120 connected with the fan assembly 110 and the heater assembly 150. In some examples, the connection unit 120 is configured to connect with a fan assembly 110 and a heater assembly 150 that have differing inside and/or outside diameters.

Figure 2F:
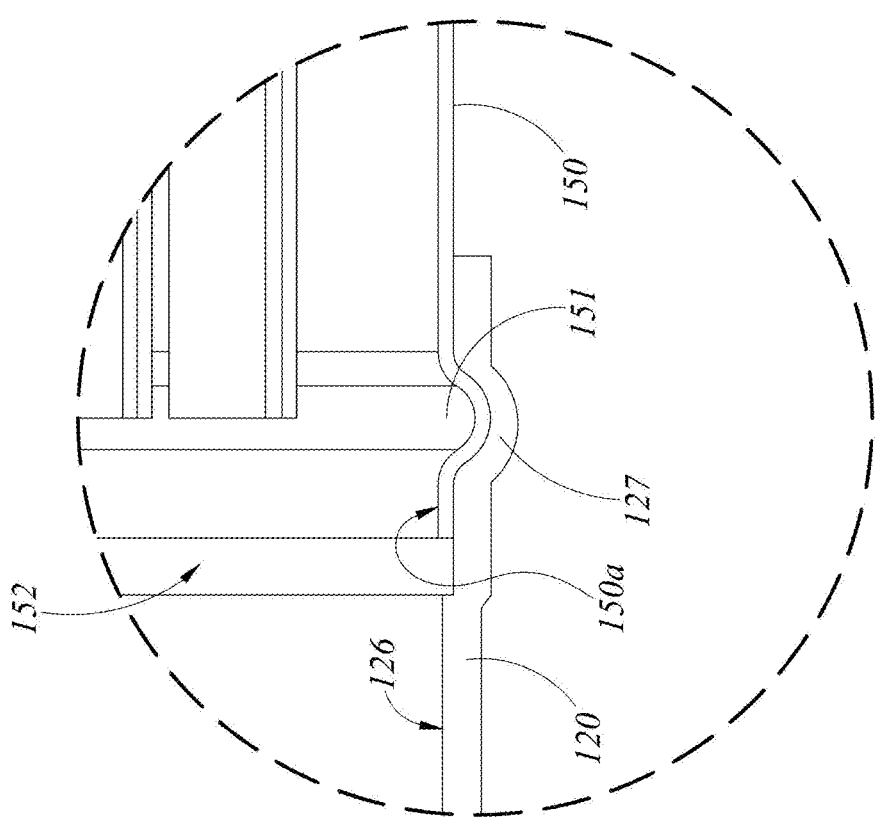
FIG. 2F illustrates an enlarged view of another portion of FIG. 2D.
Figure 2E:
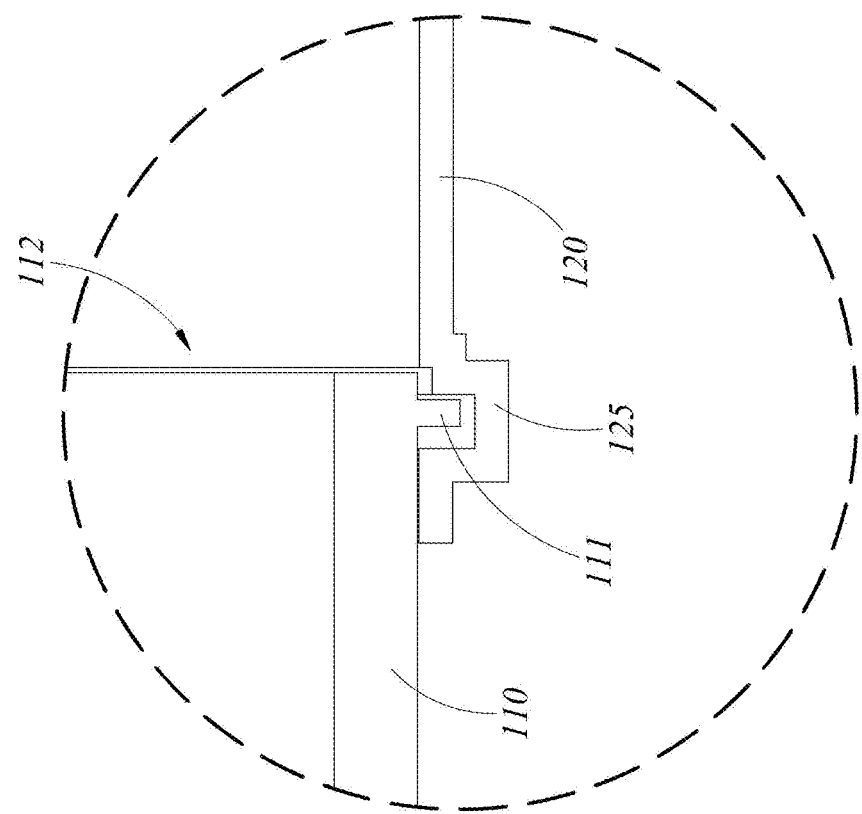
FIG. 2E illustrates an enlarged view of a portion of FIG. 2D.

FIG. 2E further illustrates the connection between the fan assembly 110 and the connection unit 120. As shown, the fan assembly 110 and the connection unit 120 can include an engagement portion such that the fan assembly 110 and the connection unit 120 are secured together.

As shown, the fan assembly 110 can include a blade feature 111 on the exit end of fan assembly 112. In some examples, the connection unit 120 can include a slot detail 125 that is configured to engage with the blade feature 111. In some examples, the blade feature 111 can be configured to surround both the input and output ends of the fan assembly 110. In some embodiments, the slot detail 125 of the connection unit 120 extends substantially around the entire periphery of the unit. In some examples, the slot detail 125 can extend 360 degrees about the opening of the fluid straightening unit 120. The slot detail 125 can be located axially about the opening of the connection unit 120. In some examples, the connection between the blade feature 111 and the slot detail 125 can reduce stress on the fan assembly 110. In some embodiments, the blade feature 111 can be located on the connection unit 120 while the slot detail 125 can be located on the fan assembly 110. In some examples, the engagement between the fan assembly 110 and the connection unit 120 can have any mechanical configuration that allows the fan assembly 110 and connection unit 120 to be secured together.

FIG. 2F further illustrates the connection between the connection unit 120 and the heater assembly 150. As shown, the heater assembly 150 can include a bead 151 near the front end of the heater 152. In some examples, the connection unit 120 can include an indentation 127 on the inner surface 126 of the connection unit 120 that is configured to engage with the bead 151 of the heater assembly 150. In some examples, the bead 151 of the heater assembly 150 is a conventional AS5141 or MS3660 bead type. Like the slot detail 125, the indentation 127 can extend substantially around the entire periphery of the unit. In some examples, the indentation 127 can extend 360 degrees about the opening of the heater assembly 150. The indentation 127 can be located axially about the opening of the connection unit 120. In some embodiments, the indentation 127 is configured to capture the bead 151 of the heater assembly 150. In some embodiments, the indentation 127 forms a protrusion on the exterior of the connection unit 120 to allow the bead 151 of the heater assembly 150 to be relieved into the inner surface 126 of the connection unit 120.

As shown in FIG. 2F, in some examples, the connection between the connection unit 120 and the heater assembly 150 can inhibit or prevent foreign object damage. In some instances, damage can result from debris becoming entrapped or catching onto an exposed end of the heater assembly 150, such as an exposed end of a sidewall of the heater assembly 150. In some examples, the connection between the connection unit 120 and the heater assembly 150 can provide a generally smooth flow path for the air incoming into the heater assembly 150. For example, as shown, the inner surface 126 of the connection unit 120 and the inner surface 150a of the heater assembly 150 can be substantially aligned with and/or substantially co-linear with each other. A smooth transition from the inner surface of the connection unit 120 to the inner surface of the heater assembly 150 can reduce friction of the airflow. In some examples, the smooth transition can reduce and/or prevent turbulent airflow from forming, which could negatively impact the rate and/or quantity of the airflow.

Separable Portions

Figure 3A:
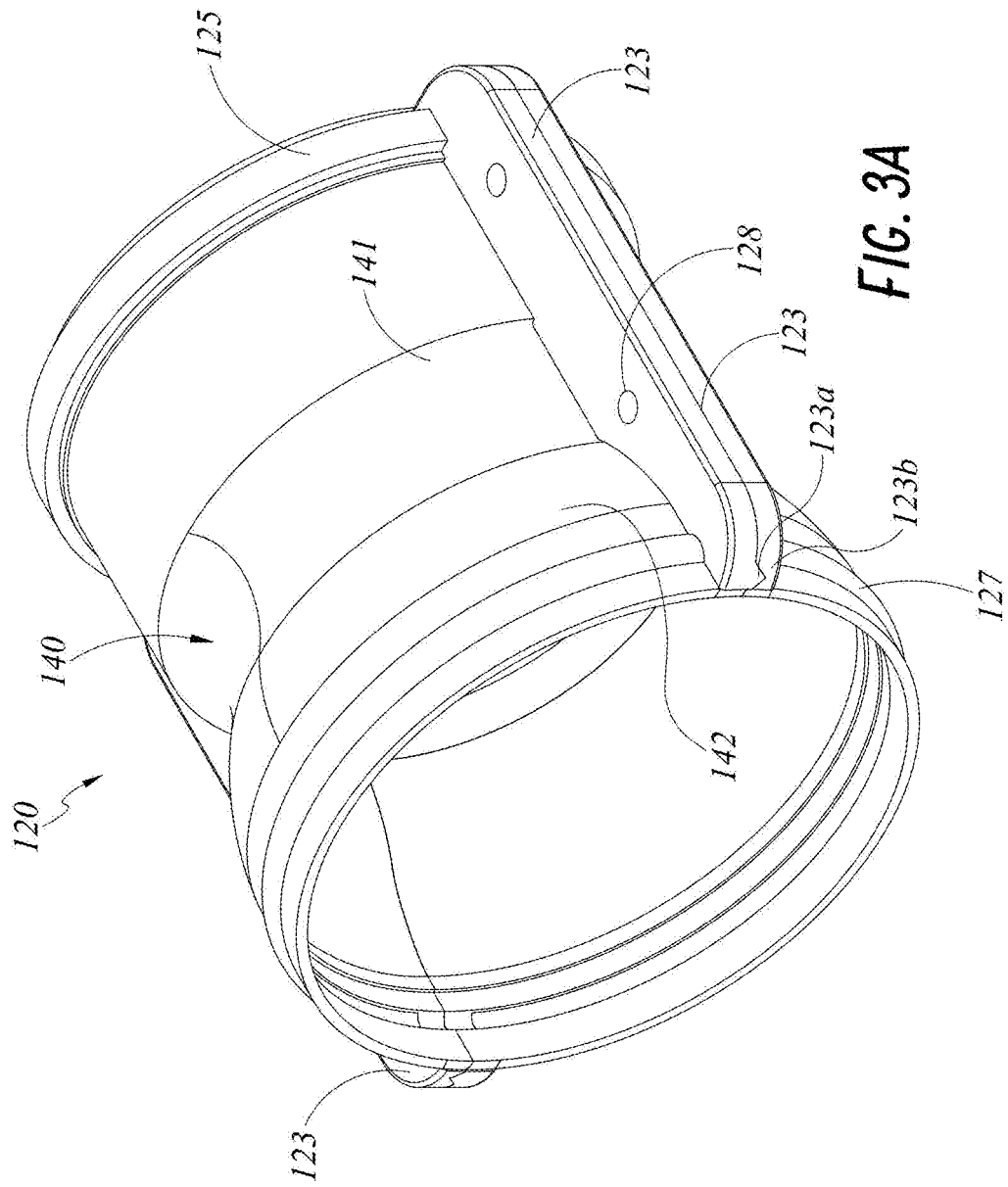
FIG. 3A illustrates a perspective view of a connection unit of the system of FIG. 2A.
Figure 3B:
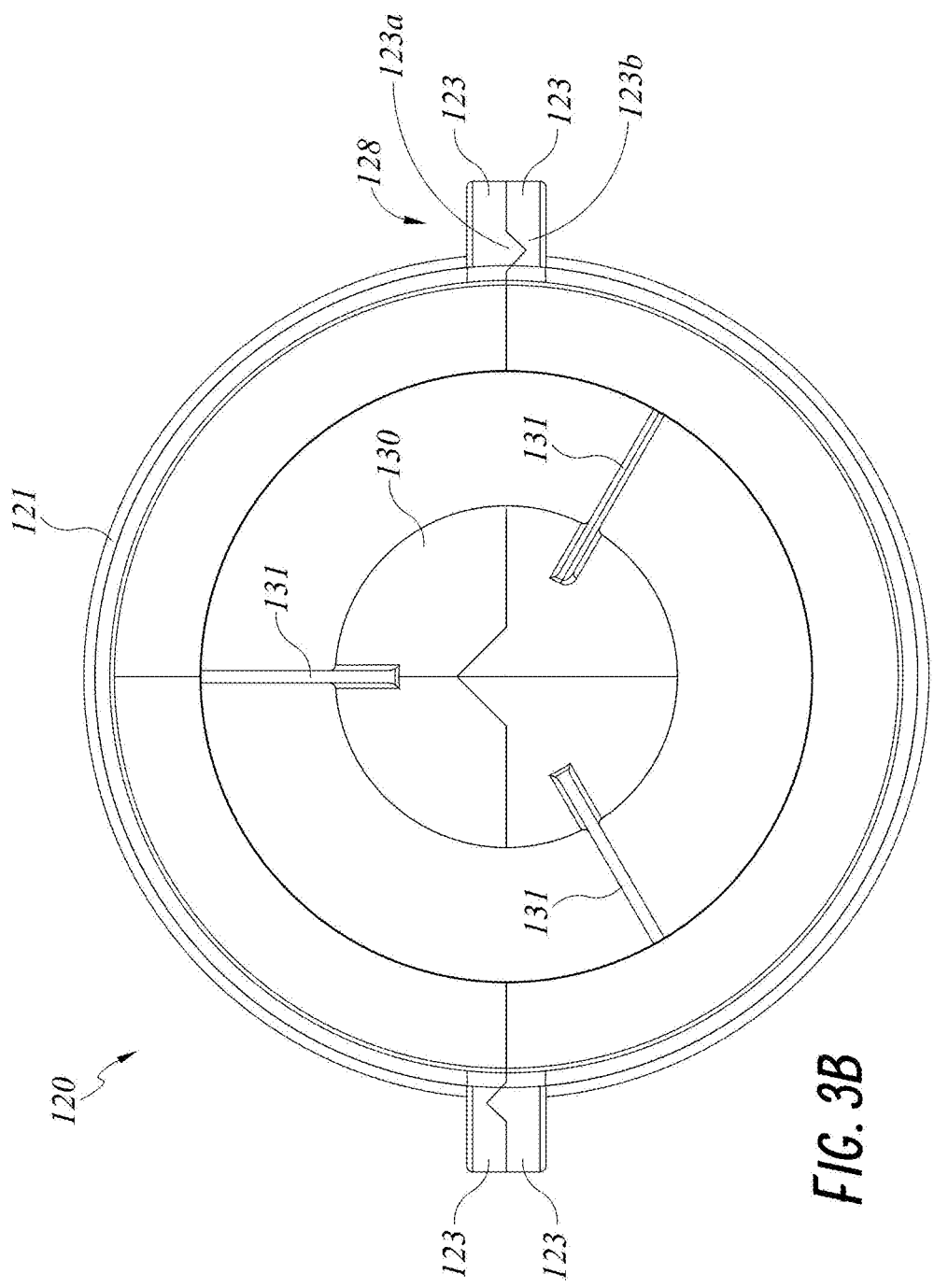
FIGS. 3B and 3C illustrate front and rear views of the connection unit of FIG. 3A.
Figure 3C:
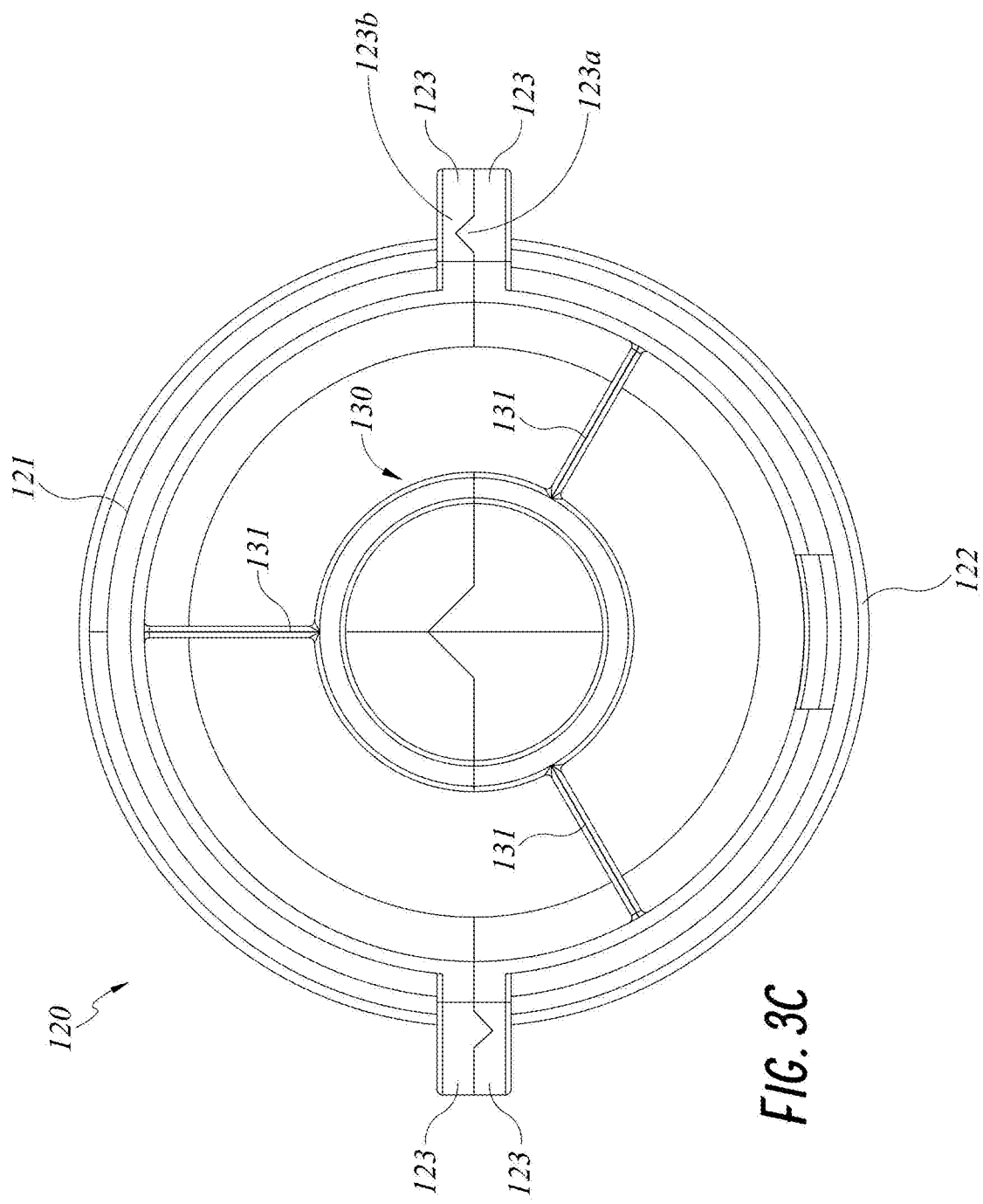

FIGS. 3A-3C illustrate an example of the connection unit 120. FIG. 3A illustrates a perspective view of the connection unit 120. FIG. 3B illustrates a rear view of the connection unit 120 from the output end of the connection unit 120 where airflow is leaving the connection unit 120 and entering the heater assembly 150. FIG. 3C illustrates a front view of the connection unit 120 from the input end of the connection unit 120 where airflow is entering the connection unit 120 after exiting the fan assembly 110. As will be discussed in more detail below, the connection unit 120 can include a drag reduction unit 130, a plurality of ears 123, and/or a wake diverter 140. In some examples, the drag reduction unit 130 is supported by and/or centered within the connection unit 120 by a plurality of support structures 131.

Figure 4A:
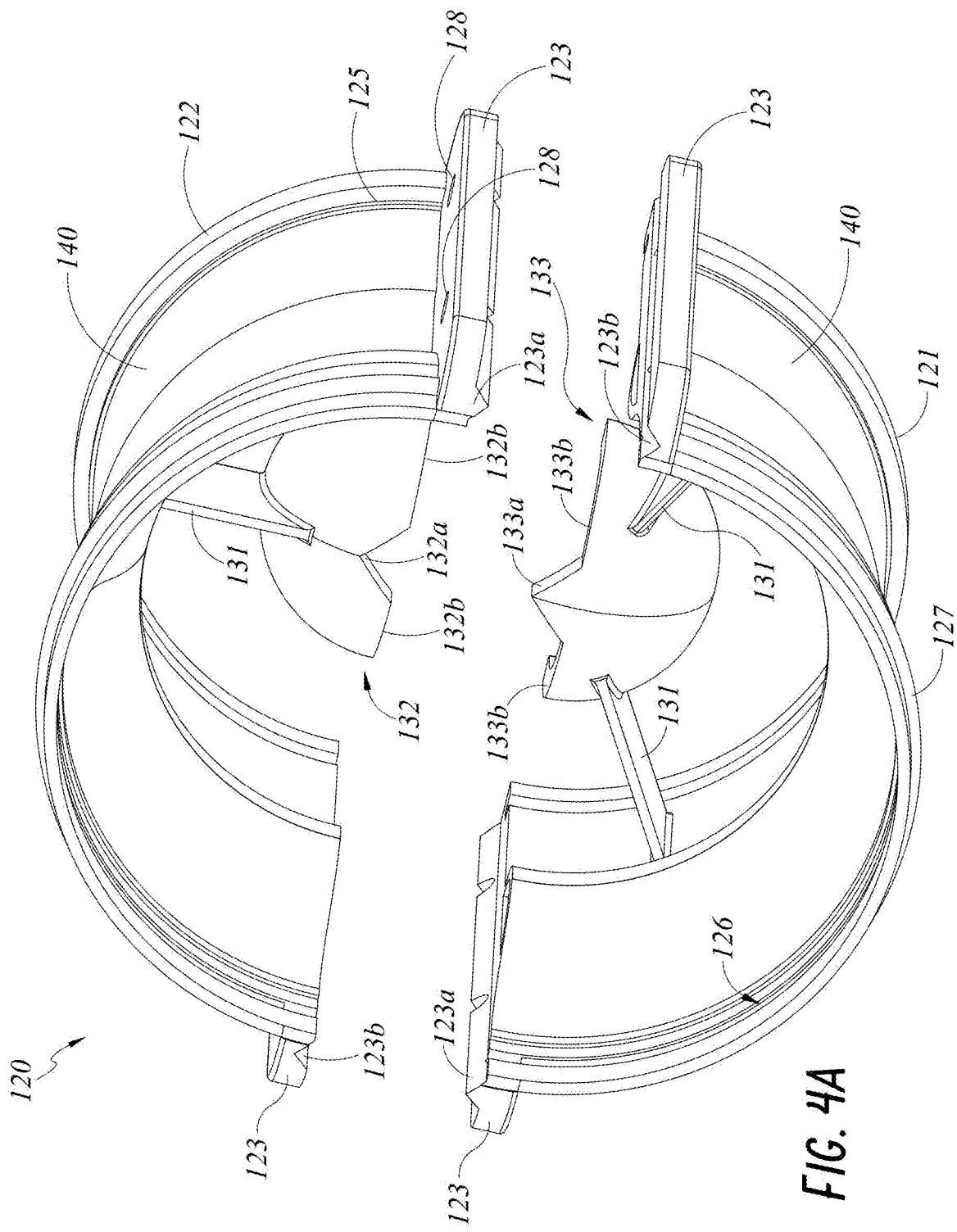
FIG. 4A illustrates an exploded view of the connection unit of FIG. 3A.
Figure 4B:
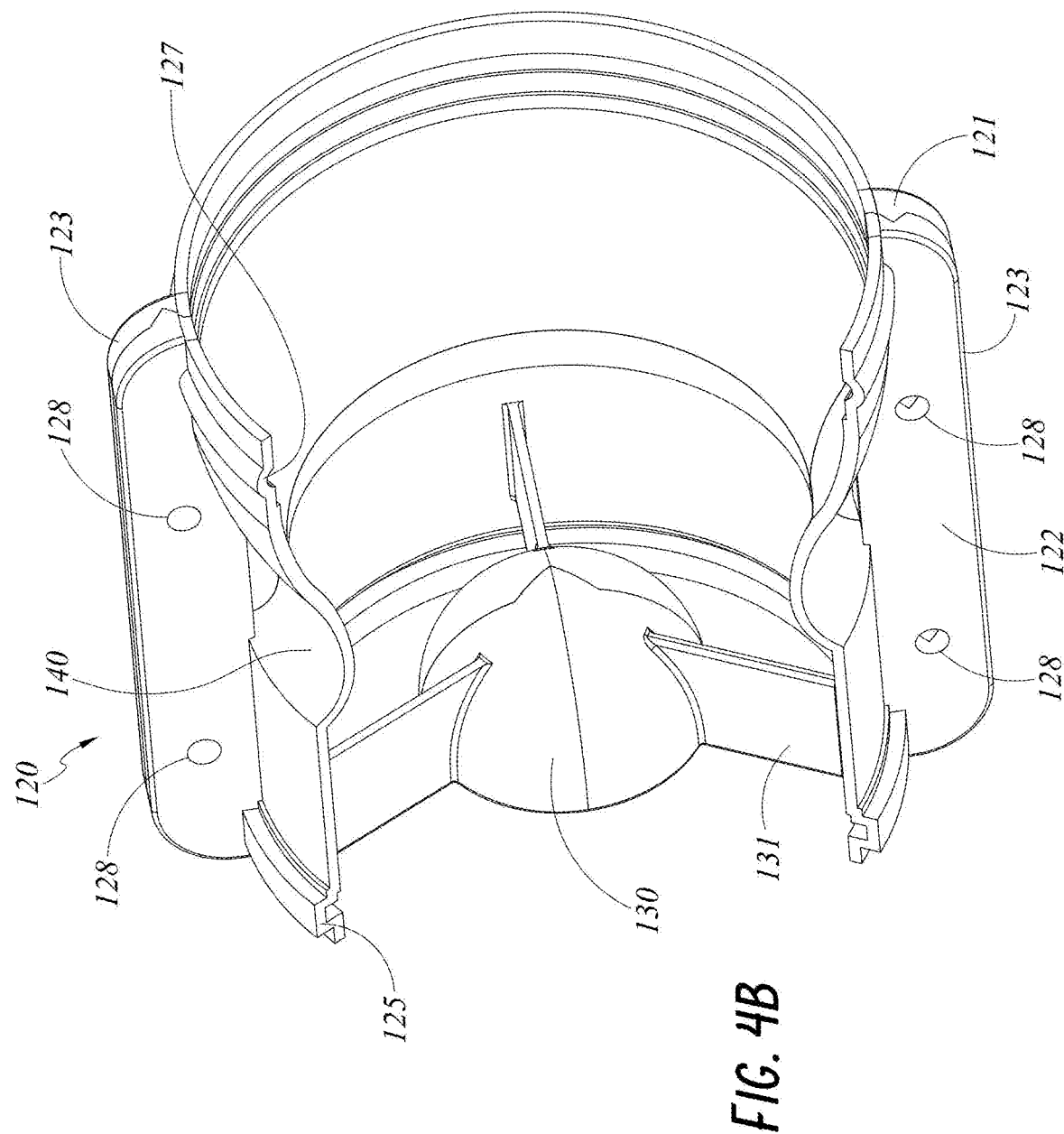
FIG. 4B illustrates a partial cross-sectional view of the connection unit of FIG. 3A.

In some embodiments, the connection unit 120 can be formed from multiple separable sections. This can enable the connection unit 120 to be readily attached to the heater assembly 150 and/or the fan assembly 110, such as by securing both portions of the connection unit 120 to respective portions of the heater assembly 150 and/or connection unit 120 as well as to each other. In some embodiments, the connection unit 120 is formed from a plurality of sections that are configured to be secured together. For example, the connection unit 120 can be formed from two complementary portions, such as a first connector portion 121 and a second connector portion 122. FIG. 4A illustrates an exploded view of the portions 121, 122. FIG. 4B illustrates a partial cross-sectional view of the connection unit 120 to illustrate an example of how the portions 121, 122 can be engaged.

As shown, the portions 121, 122 can include corresponding engagement features. The features can be configured to enable respective ends of the portions 121, 122 of the connection unit 120 to be engaged with the fan assembly 110 and the heater assembly 150, and to secure the portions 121, 122 together. In some embodiments, the first connector portion 121 and/or the second connector portion 122 can include one or more (e.g., a pair) ears 123 that are configured to engage with and be secured with the corresponding ears 123 of the other half.

In some examples, the engagement portions of the ears 123 can have alignment features. For example, first connector portion 121 and the second connector portion 122 can include an engagement portion 123a that is configured to engage with an engagement portion 123b of another of the pair of ears 123 of the first connector portion 121 and the second connector portion 122. This can improve blind installation capabilities, such as where the fan assembly 110 or the heater assembly 150 is undergoing maintenance while the connection unit 120 is still mounted, such as on an aircraft.

In some examples, the ears 123 can include a plurality of fastener openings 128. The plurality of fastener openings 128 is configured to receive a variety of standard fasteners 124. Fastener types can include, for example, captured or quick release fasteners.

Figure 5:
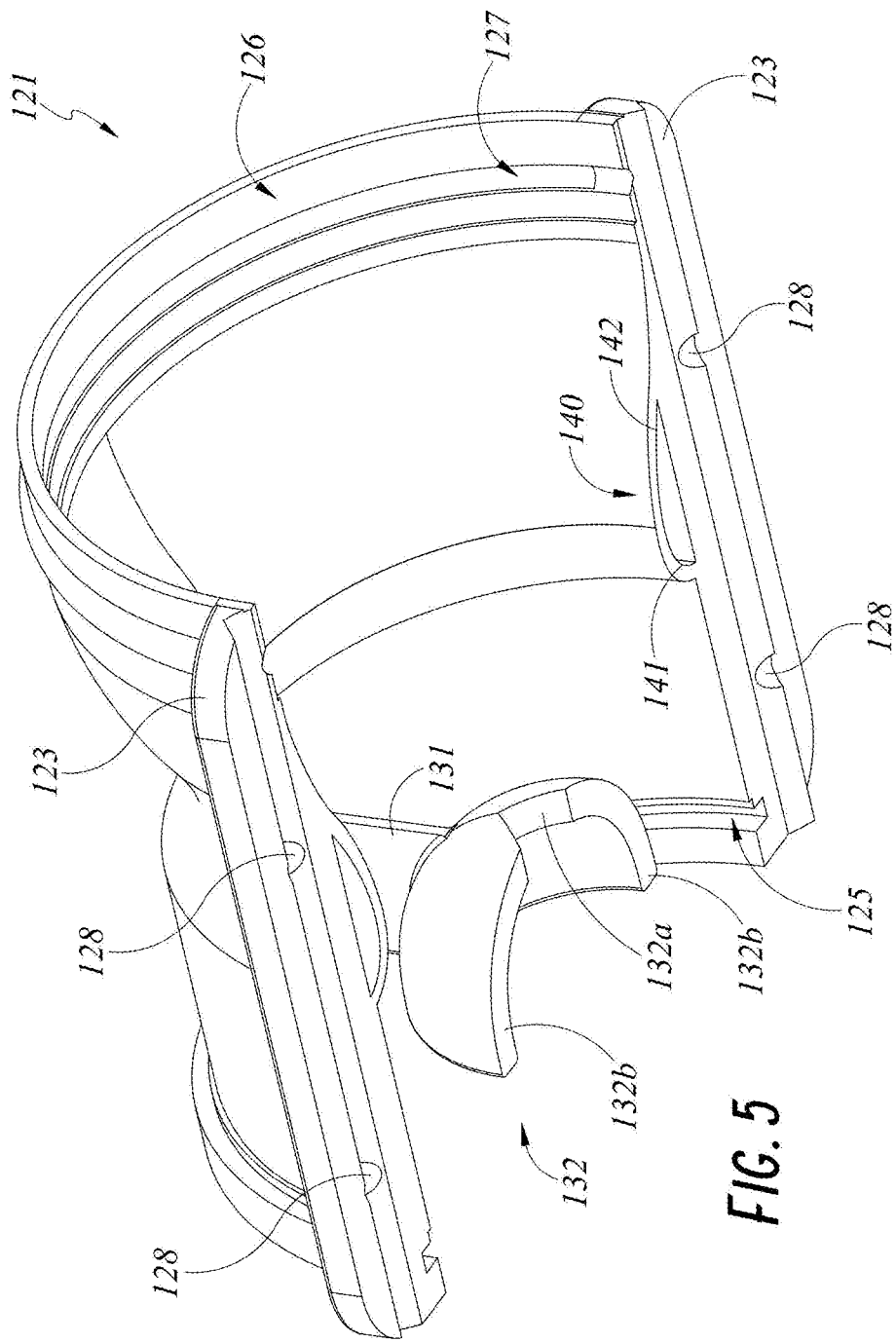
FIG. 5 illustrates a perspective view of a front portion of the connection unit of FIG. 3A.
Figure 6:
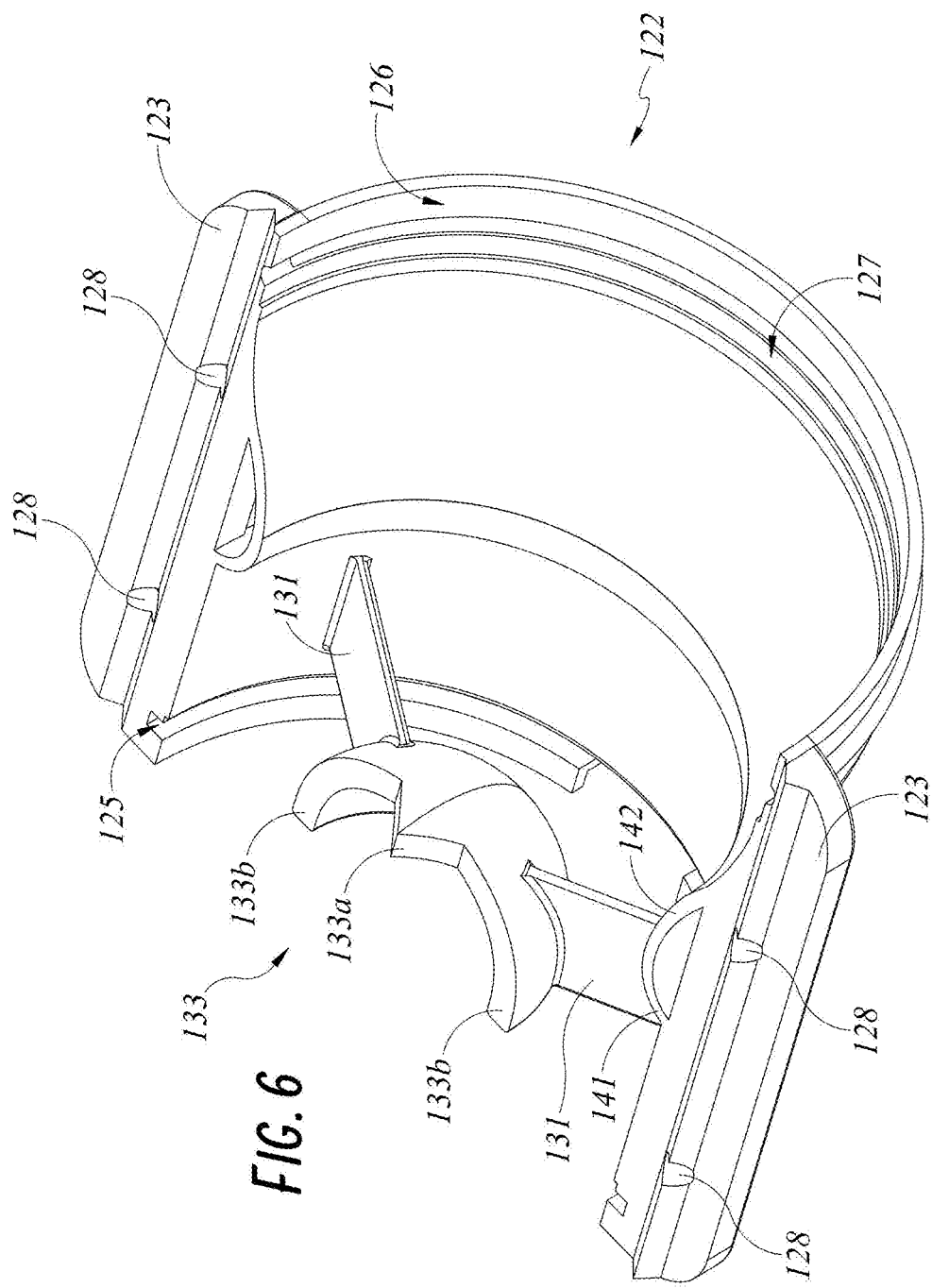
FIG. 6 illustrates a perspective view of a second portion of the unit of FIG. 3A.

FIGS. 5 and 6 illustrate the first connector portion 121 and the second connector portion 122, respectively. In some embodiments, the first connector portion 121 can include a plurality of ears 123. In some examples, the first connector portion 121 can include a first portion 132 of the drag reduction unit 130. In some embodiments, the first connector portion 121 can include at least one support structure 131. In some examples, the first connector portion 121 can include a wake diverter 140. As will be discussed in more detail below, in some examples, the wake diverter 140 can protrude inwardly from an interior surface of the first connector portion 121.

In some embodiments, portions of the second connector portion 122 are similar or identical to the first connector portion 121. For example, the second connector portion 122 can include a plurality of ears 123. In some embodiments, the second connector portion 122 can include a second portion 133 of the drag reduction unit 130. In some examples, the second connector portion 122 can include at least one support structure 131. In some embodiments, the second connector portion 122 can include a wake diverter 140. In some examples, the wake diverter 140 can protrude inwardly from an interior surface of the second connector portion 122.

As discussed above, in some embodiments, a first end of the first connector portion 121 and a first end of the second connector portion 122 can include at least a portion of the slot detail 125, which can be configured to engage and secure the fan assembly 110. In some examples, a second end of the first connector portion 121 and a second end of the second connector portion 122 can include at least a portion of the indentation 127 that is configured to engage and secure the heater assembly 150.

Drag Reduction Unit

Figure 7:
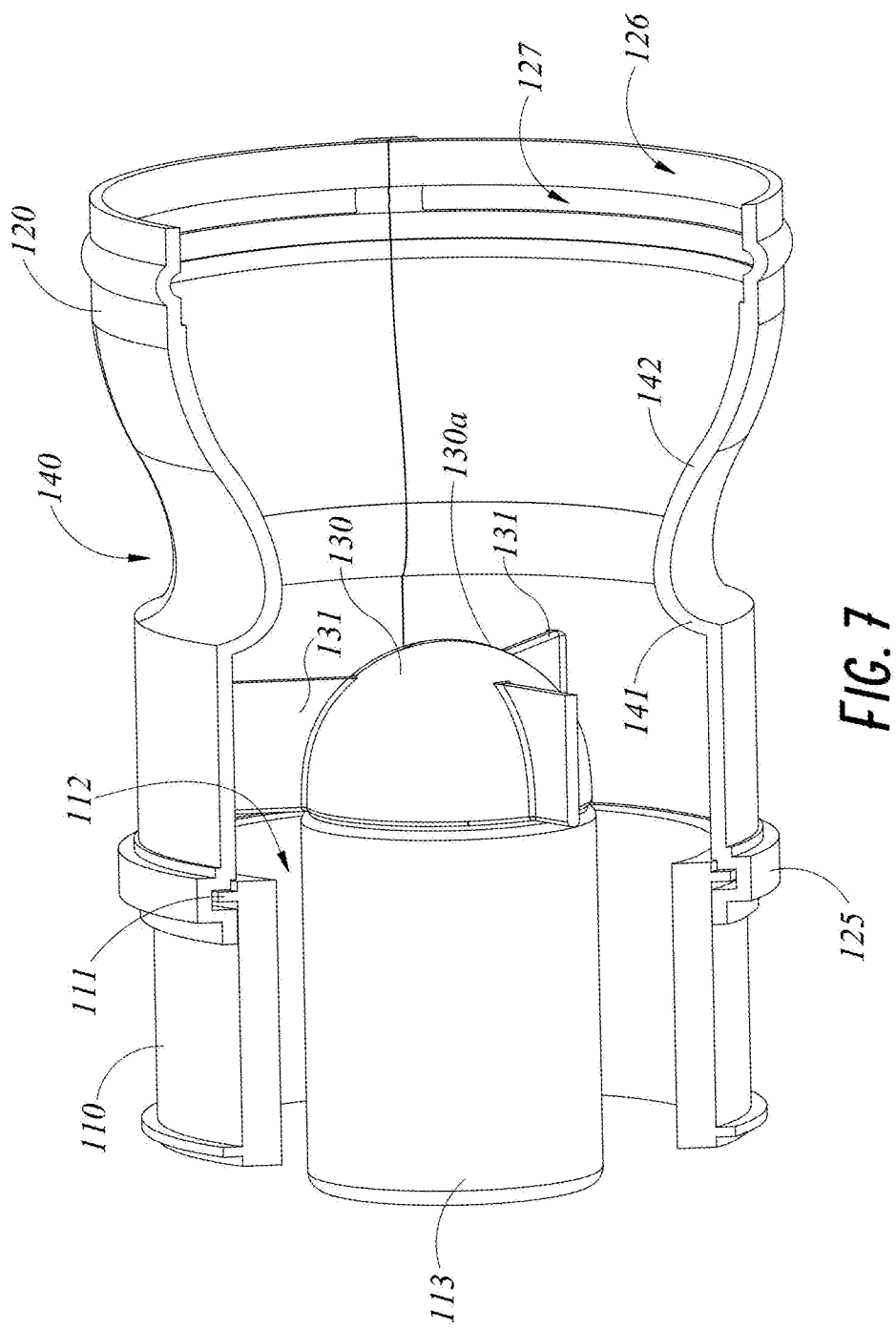
FIG. 7 illustrates a partial cross-section of a fan assembly and the partial connection unit of the system of FIG. 2A.

FIG. 7 illustrates a partial cross-sectional view of the connection unit 120 attached to the fan assembly 110. As mentioned above, the connection unit 120 can include a drag reduction unit 130. In some examples, the drag reduction unit 130 is axially aligned with a motor 113 of the fan assembly 110. Some motors 113 can have a blunt trailing edge. In contrast, the drag reduction unit 130 can have a curved convex surface on a trailing edge 130*a*. For example, the trailing edge 130*a* can be generally hemispherical in shape. The drag reduction unit 130 can be configured to redirect the airflow towards the center of the connection unit 120 and/or the attached heater assembly 150. In some examples, the size, radius, and length of the drag reduction unit 130 can vary depending on the desired airflow rate and/or the power of the fan assembly 110.

In some embodiments, the drag reduction unit 130 is configured to reduce an area of high pressure and/or dead space, such as a region immediately downstream of a motor of the fan assembly 110. In various embodiments, the drag reduction unit 130 is configured to divert a portion of the airflow into such a region. For example, the drag reduction unit 130 can divert a portion of airflow from the periphery of the duct towards the radial center of the duct. As illustrated in FIG. 7, the trailing edge 130*a* forms a smooth and/or continuous curved surface. The curved surface can be generally smooth and/or continuous. In some embodiments, the trailing edge 130*a* has a curved surface with a radius of curvature of at least about: 0.375 inches, 0.50 inches, 0.75 inches, 1.0 inches. In some examples, the radius of curvature can generally coincide with the diameter of the axial fan unit. In contrast to the sharp corner formed by the motor 113, the trailing edge 130*a* can allow airflow to flow efficiently and/or smoothly along the surface of the trailing edge 130*a*. In some implementations, a boundary layer is formed above the trailing edge 130*a* that has air with higher viscosity than air further away from the trailing edge 130*a*. The increased viscosity causes air in the boundary layer to "stick" to the surface of the trailing edge 130*a*. As the air in the boundary layer follows the surface of the trailing edge 130*a*, air flowing adjacent to the boundary layer can be redirected to generally follow the curved surface of the trailing edge 130*a*. In some examples, the curved surface of the trailing edge 130*a* redirects the high velocity airflow from the periphery of the tube (e.g., flowing past the motor 113) towards the radial center of the connection unit 120. As will be illustrated in FIGS. 9A-9D below, this redirection of airflow will reduce the length of dead space that may exist immediately downstream of the motor 113.

As shown in FIGS. 3A-3B, 4, and 5, the portions of the drag reduction unit 130 are attached to the inner surface 126 of the connection unit 120 by a plurality of support structures 131. For example, as seen in FIG. 4, the second part 133 is secured by two support structures 131 while, as shown in FIG. 5, the first part 132 is secured by a support structure 131. The number of support structures 131 can vary in number, size, and configuration. In some embodiments, the support structures 131 can block and/or reduce the rotational thrust of the airflow from the fan blades of the fan assembly 110. The positioning of the support structures 131 can provide for better heat distribution. In some embodiments, the support structures 131 can reduce drag and/or inhibit rotational airflow. For example, the blade shape of the support structure 131 can redirect the rotational movement of the airflow from the fan assembly 110 and streamline it to flow down the length of the connection unit 120. The support structures 131 can perform as vanes to guide and/or straighten the airflow.

In some embodiments, the drag reduction unit 130 is formed from separate parts, such as a first part 132 and a second part 133. The parts 132, 133 can form the drag reduction unit 130 when the first connector portion 121 and the second connector portion 122 are secured together. In some examples, the first and/or second parts 132, 133 of the drag reduction unit 130 can include engagement portions such that the first part 132 and second part 133 can form the drag reduction unit 130. For example, the first part 132 can include an engagement portion 132*a* and two straight portions 132*b* on either side of the engagement portion 132*a*. The second part 133 can include an engagement portion 133*a* and two straight portions 133*b* on either side of the engagement portion 133*a*. In some embodiments, when the first connector portion 121 and the second connector portion 122 are secured together, the engagement portion 132*a* of the first part 132 is configured to engage with the engagement portion 133*a* of the second part 133, while the straight portions 132*b* of the first part 132 are aligned adjacent to the straight portions 133*b* of the second part 133.

Wake Diverter

As mentioned above, the inner surface of the connection unit 120 can include a wake diverter 140. As shown in FIGS. 5 and 6, the wake diverter 140 is positioned axially along the periphery of each portion of the connection unit 120. In some embodiments, when the portions of the connection unit 120 are connected, the wake diverter 140 on the first connector portion 121 and the second connector portion 122 can be aligned to form an unbroken profile about the inner surface of the connection unit 120. The wake diverter 140 can form a profile within the inner surface 126 of the connection unit 120. Each of these features will be discussed in more detail below.

FIG. 8 illustrates a cross-sectional view of the connection unit 120 and provides an enlarged view of an example profile of the wake diverter 140 and the airflow redirection provided. In some embodiments, the wake diverter 140 can be wing-shaped. The wake diverter 140 can include a leading edge 141. The leading edge can be shaped as a convex curve and/or can encourage (e.g., lift) a portion of the air flowing over the wake diverter to flow towards the radial center of the connection unit 120. In some examples, the wake diverter 140 can include a trailing edge 142. The trailing edge 142 can form a straight portion. In some embodiments, the trailing edge 142 can direct a portion of the air flowing over the wake diverter 140 back to the periphery of the connection unit 120. As will be discussed in detail below, the shape of the leading edge 141 and the trailing edge 142 of the wake diverter 140 can serve to redirect airflow through the connection unit 120.

As described above, the drag reduction unit 130 can direct a flow of the air passing through the connection unit 120. In some embodiments, the drag reduction unit 130 can direct a first portion of the flow of air from a periphery of the passage toward a radial center of the passage, the leading edge 141 can direct a second portion of the flow of air from a periphery of the passage toward the radial center of the passage, and/or the trailing edge 142 can direct a third portion of the flow of air toward the periphery of the connection unit 120. In certain embodiments, of the volume of air entering the connection unit 120, the first portion comprises about 60% and the sum of the second and third portions comprises about 40%. In some variants, of the volume of air passing over or near the wake diverter 140, the second portion (e.g., the portion directed by the wake diverter 140 toward the radial center of the connection unit 120) comprises about 60% and the third portion (e.g., the portion directed by the wake diverter 140 toward the periphery of the connection unit 120) comprises about 40%.

In some examples, the connection unit 120 can have a length $L_{overall}$ of about: 2.0 inches, 2.5 inches, 3.0 inches, 3.5 inches, 4.0 inches, 4.5 inches, 5.0 inches, 5.5 inches, or 6.0 inches. In some embodiments, the wake diverter 140 can have a length $L_c$ of at least about: 0.5 inches, 0.75 inches, 1.0 inches, 1.25 inches, 1.5 inches, or 2.0 inches. In some examples, the ratio of $L_{overall}$ to $L_c$ can be at least about: 4:1, 3.9:1, 3.8:1, 3.7:1, 3.6:1, 3.5:1, 3.4:1, 3.3:1, 3.2:1, 3.1:1, or 3:1.

As illustrated, in various embodiments, the wake diverter 140 is completely or partially downstream of the drag reduction unit 130. In some examples, the wake diverter 140 can be located a distance d downstream from a downstream end of the drag reduction unit 130. In some embodiments, the wake diverter 140 can be located a distance d of at least about: 0.05 mm, 0.10 mm, 0.15 mm, 0.20 mm, 0.25 mm. 0.30 mm, 0.35 mm, 0.40 mm, 0.45 mm, or 0.50 mm downstream from the downstream end of the drag reduction unit 130. In some embodiments, the wake diverter 140 can be located at least about: 0.5 inches, 0.55 inches, 0.60 inches, 0.65 inches, 0.70 inches, or 0.75 inches from the downstream end of the connection unit 120.

The drag reduction unit 130 can be positioned at or near the upstream end 120a of the connection unit 120. For instance, the front end of the drag reduction unit 130 in the illustrated embodiment is spaced a distance $d_2$ from the upstream end 120a of the connection unit 120. In some examples, the location for the drag reduction unit 130 is dependent on the location of the exit end of fan assembly 112. In various implementations, distance d2 can be at least about: 0.03 inches, 0.04 inches, 0.05 inches, 0.06 inches, or 0.07 inches. The distance d2 can provide for the vibration of the axial fan. In some embodiments, this distance can inhibit or prevent the drag reduction unit 130 from coming in contact with the axial fan as the fan turns.

In some examples, the leading edge 141 of the wake diverter 140 is configured to divert and/or lift a portion of the relatively slow moving air from the periphery of the fan assembly 110. The air can be diverted and/or concentrated toward a radial center of the connection unit 120 along the drag reduction unit 130. In some embodiments, the wake diverter 140 can be configured to reduce dead space downstream of the motor by diverting peripheral airflow towards the radial center of the system. In various embodiments, the wake diverter 140 can function in conjunction with the drag reduction unit 130. For example, in some implementations, the wake diverter 140 and the drag reduction unit 130 together can provide a substantially uniform flow rate and/or flow volume. In certain variants, the maximum and minimum flow rate and/or flow volume across the cross section of the exit of the connector unit 120 differ by less than or equal to about 20%.

As illustrated in FIG. 8, the leading edge 141 forms an airflow guiding surface, such as a curved surface. This curved surface can be configured to guide and/or allow a portion of the total airflow $A_T$ passing through the connection unit 120. For example, a portion of the airflow (e.g., portion $A_1$) can be directed to flow along and or/near the leading edge 141. In some embodiments, the airflow efficiently and/or smoothly follows the surface of the leading edge 141. A boundary layer is formed above the leading edge 141 that has air with higher viscosity than air further away from the leading edge 141. The increased viscosity causes air in the boundary layer to "stick" to the surface of the leading edge 141. As the air in the boundary layer follows the surface of the leading edge 141, air flowing adjacent to the boundary layer can be redirected to generally follow the curved surface of the leading edge 141 (e.g., portion $A_2$). In some examples, the leading edge 141 diverts the high velocity airflow from the periphery of the tube (e.g., flowing past the motor 113) towards the radial center of the connection unit 120.

As discussed above, in some embodiments, the trailing edge 142 forms a straight portion that angles the inner surface of the connection unit 120 back towards the periphery of the connection unit 120. In some examples, the boundary layer formed above the trailing edge 142 diverts some of the airflow back towards the periphery (e.g., portion $A_3$). In some embodiments, the trailing edge 142 is configured to reduce drag and/or reattach the airflow to the radial periphery of the heater. This configuration of the wake diverter 140 prevents too much air from being directed to the center of the connection unit 120 such that the periphery of the heater is not starved for airflow. In some embodiments, the differing portions of the wake diverter 140 (e.g., the leading edge 141 and the trailing edge 142) is configured to provide substantially constant airflow—velocity and or quantity—across the inlet of the heater assembly 150.

FIGS. 9A-9D illustrates computational fluid dynamic representations that illustrate the effect of some of the features described above (e.g., the drag reduction unit 130 and the wake diverter 140) that has airflow velocity. FIGS. 10A-10D illustrate the computational fluid dynamic representation of FIGS. 9A-9D in grayscale. The table below provides a legend of what airflow velocity each of the colors represents:

TABLE 1

| Color | Airflow Velocity |
| --- | --- |
| Red | 101.955-114.699 ft/second |
| Orange | 89.210-101.955 ft/second |
| Yellow | 76.466-89.210 ft/second |
| Light Green | 63.722-76.466 ft/second |
| Neon Green | 50.977-63.722 ft/second |
| Sea Green | 38.233-50.977 ft/second |
| Cyan | 25.489-38.233 ft/second |

TABLE 1-continued

| Color | Airflow Velocity |
|---|---|
| Light Blue | 12.744-25.489 ft/second |
| Dark Blue | 0-12.744 ft/second |

A visual representation of TABLE 1 is provided in FIG. 10. FIG. 11 illustrates the visual representation of FIG. 10 in grayscale. The airflow with the highest velocity is shown in red and orange, while airflow with the lowest velocity is shown in blue. In each of FIGS. 9A-9D, the vertical lines along the figure denotes 0.20 feet.

Figure 9A:
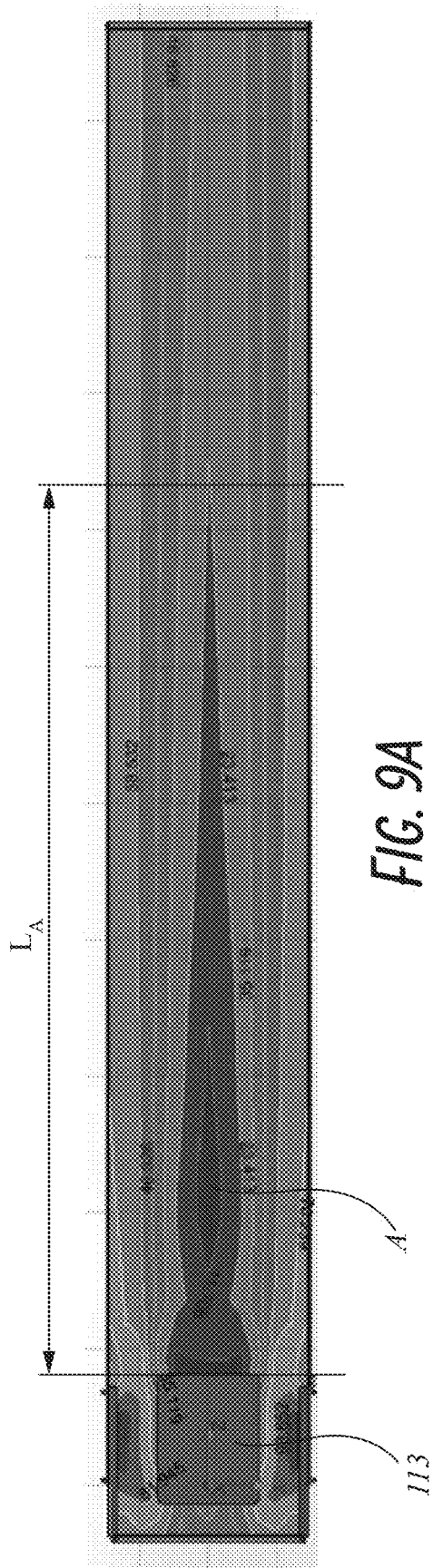
FIG. 9A illustrates a representation of the velocity of the flow of air through an environmental control system including a fan assembly.

As shown in FIGS. 9A-9D, laminar airflow averages between about 59.977-63.722 ft/second (shown in neon green) and is present as air enters the fan assembly 110 and also further along the length of the straight tube. FIG. 9A illustrates the airflow of an example environmental control system where only a motor 113 of a fan assembly 110 is present. As shown, because the motor 113 obstructs the center portion of the tube, the velocity of airflow is fastest about the periphery of the tube (as shown in red, orange, and yellow). In contrast, as shown in region A, airflow velocity is the slowest directly downstream of the motor 113 and along the center of the tube (as shown in dark blue, light blue, and cyan). The effect on laminar airflow that the motor 113 has persists along a significant length of the tubing, and the airflow velocity takes between approximately 1.2-1.6 feet to recover (e.g. to be generally laminar and/or constant across the cross-section of the duct). For example, the recovery length $L_A$ is about environmental control system 1.3 feet in FIG. 9A.

Figure 9B:
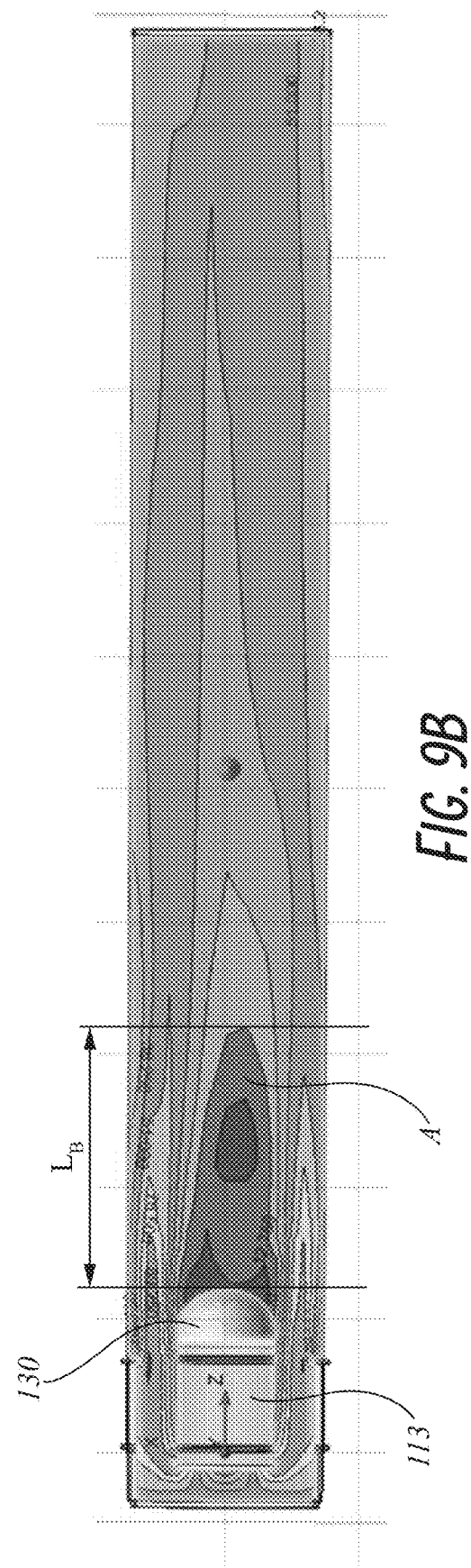
FIG. 9B illustrates a representation of the velocity of the flow of air through an environmental control system including a fan assembly with an attached drag reduction unit.

FIG. 9B illustrates an example of the effect of the drag reduction unit 130. In this example, the drag reduction unit 130 is positioned downstream and adjacent to the motor 113 of the fan assembly 110. As illustrated, because the motor 113 obstructs the center portion of the tube, the amount and velocity of airflow is the greatest along the periphery (as shown in orange and yellow). In contrast, as shown in region A, airflow velocity is the slowest directly downstream of the motor 113 and the drag reduction unit 130 and persists generally along the center of the tube (as shown in dark blue, light blue, and cyan). However, as shown in FIG. 9B, the drag reduction unit 130 helps to reduce the length of the tube that experiences slow moving airflow through the center of the tube. In comparing the airflow velocity between FIGS. 9A and 9B (without and with the drag reduction unit 130), region A, the area of slow velocity along the center of the tube, is reduced to only a length $L_B$ of about 0.4-0.6 ft.

Figure 9C:
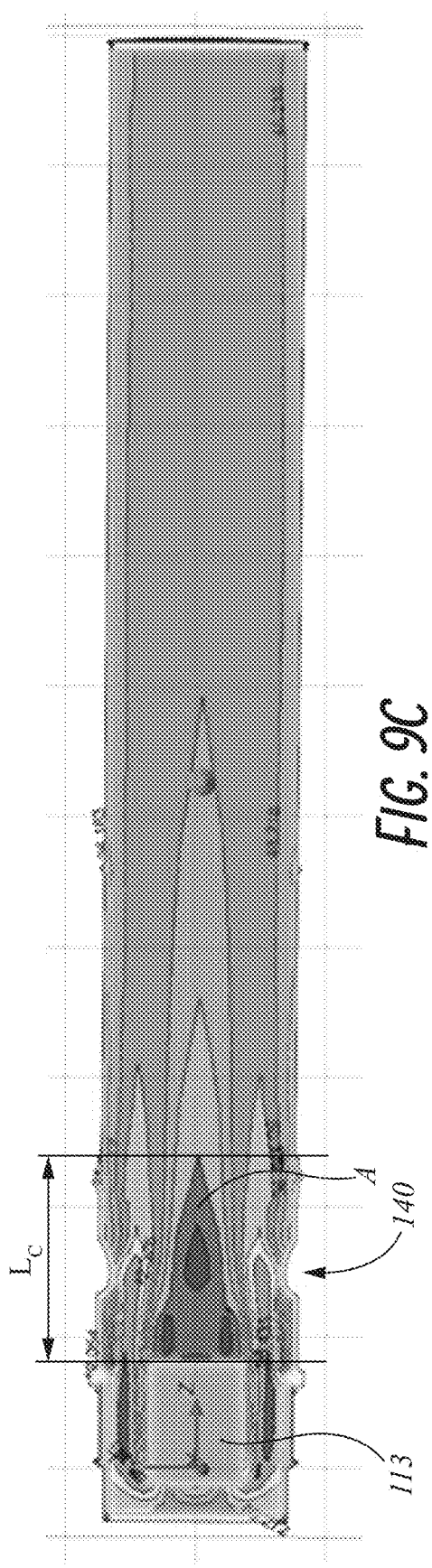
FIG. 9C illustrates a representation of the velocity of the flow of air through an environmental control system including a fan assembly with a wake diverter.

FIG. 9C illustrates an example of how the presence of a wake diverter 140 can help to reduce length of the tubing required for the laminar airflow to recover. As discussed above, because the motor 113 obstructs the center portion of the tube, the velocity of airflow is the fastest along the periphery (as shown in red, orange, and yellow). Again, as shown in region A, airflow velocity is the slowest directly downstream of the motor 113. The wake diverter 140 in FIG. 9C helps to redirect a portion of the airflow away from the periphery and towards the center of the tubing. This can provide a reduction in the recovery length. For example, as shown, the length $L_c$ can be about 0.4-0.6 feet.

Furthermore, as discussed above with regard to the wake diverter 140, the leading edge 141 of the wake diverter 140 redirects airflow towards the center of the tube, while the trailing edge 142 of the wake diverter 140 helps to pull airflow back towards the periphery. As shown, the laminar airflow can be increased along the periphery through more of the length of the tube when a wake diverter 140 is used alone (as compared to the drag reduction unit 130 alone).

Figure 9D:
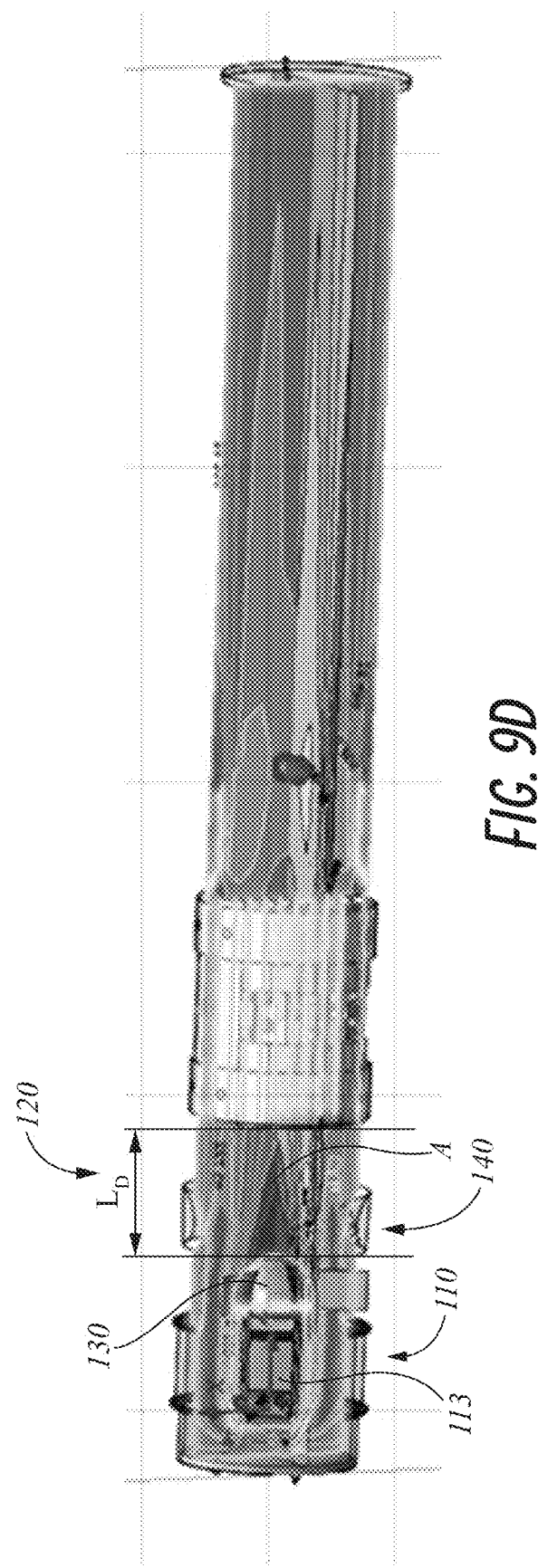
FIG. 9D illustrates a representation of the velocity of the flow of air through an environmental control system including a fan assembly, drag reduction unit, wake diverter, and a heater assembly.
Figure 11A:
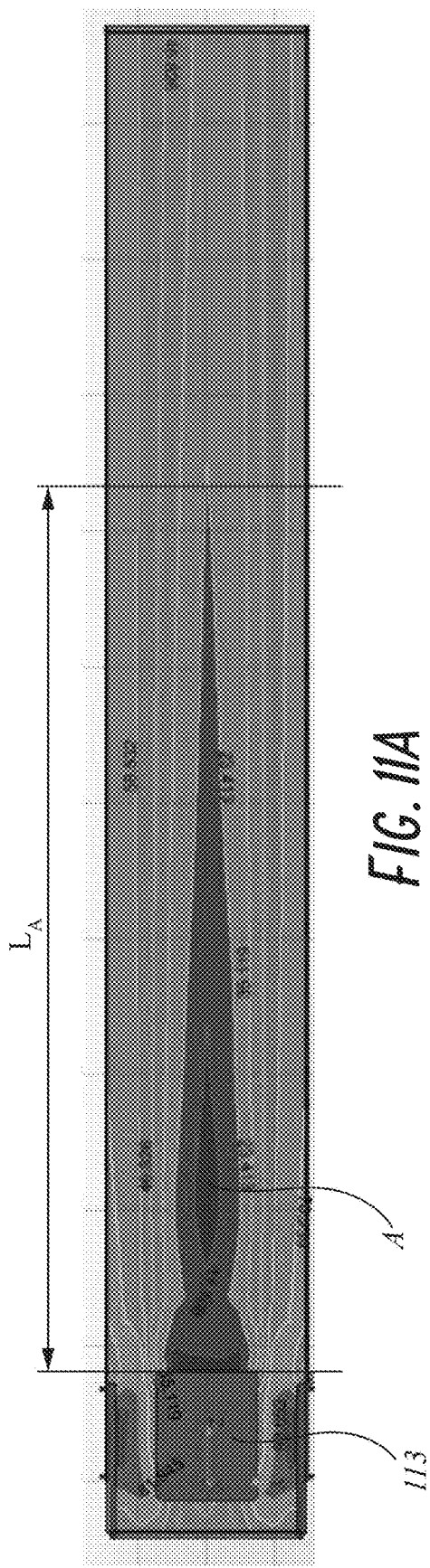
FIG. 11A illustrates the representation of the velocity of the flow of air of FIG. 9A in grayscale.
Figure 11B:
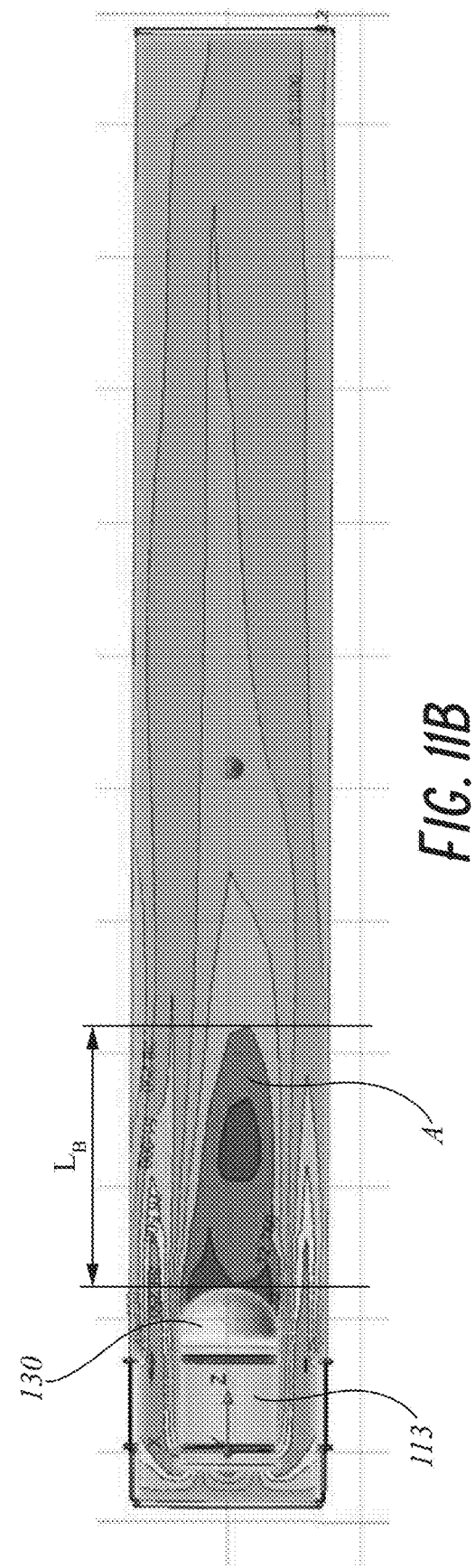
FIG. 11B illustrates the representation of the velocity of the flow of air of FIG. 9B in grayscale.
Figure 11C:
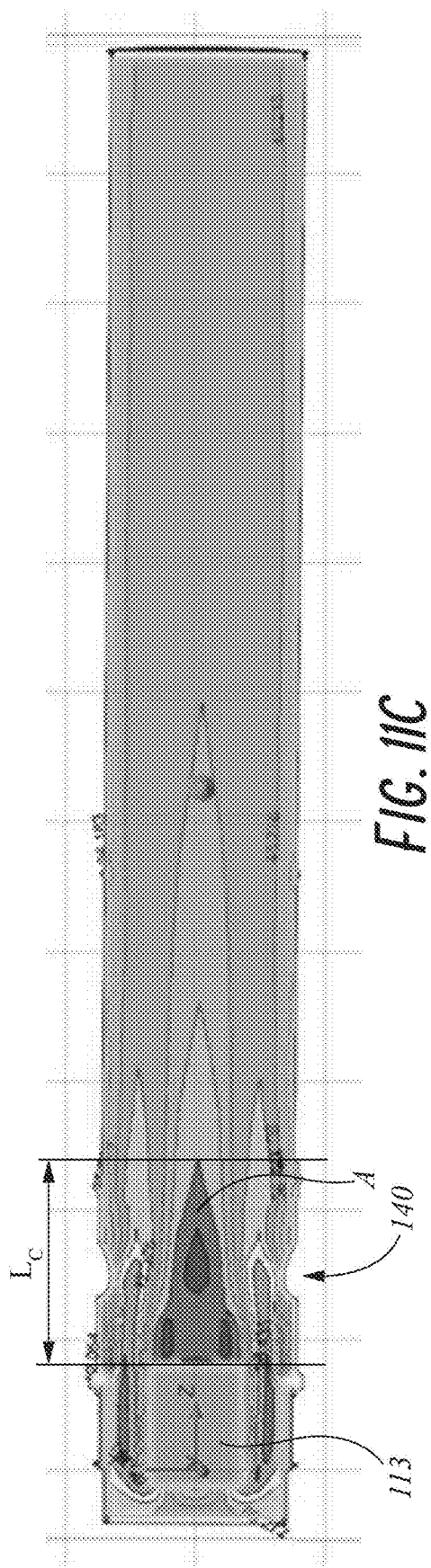
FIG. 11C illustrates the representation of the velocity of the flow of air of FIG. 9C in grayscale.
Figure 11D:
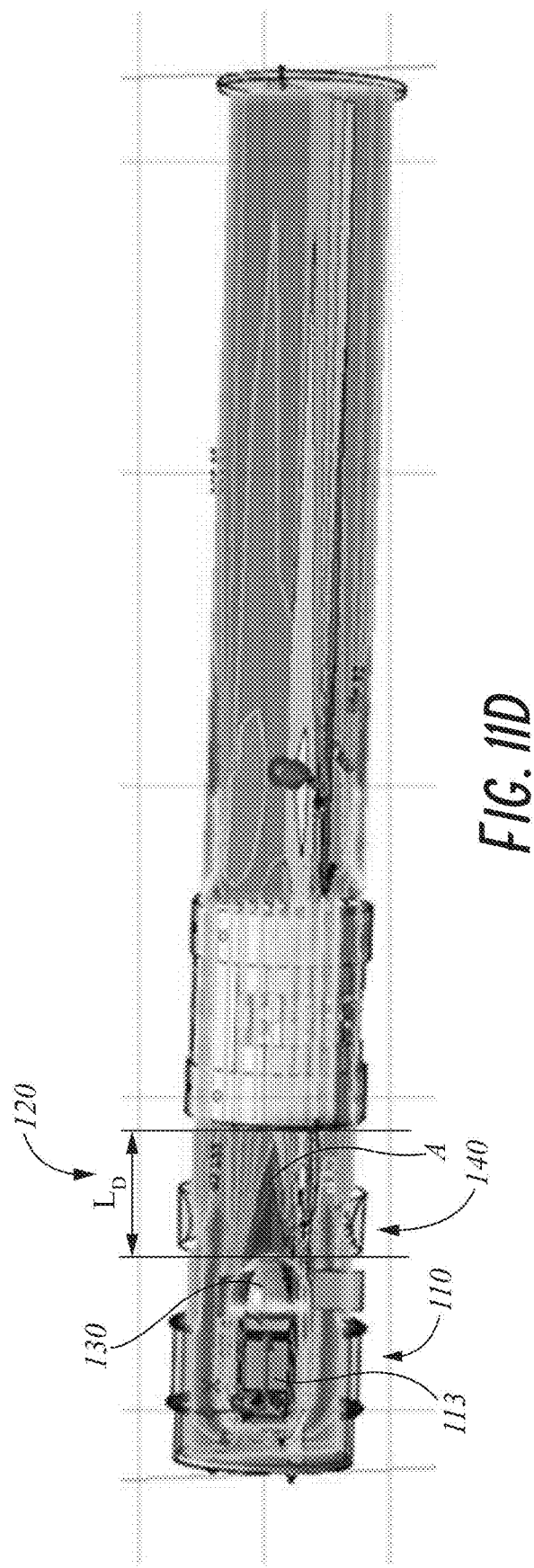
FIG. 11D illustrates the representation of the velocity of the flow of air of FIG. 9D in grayscale.
Figure 12:
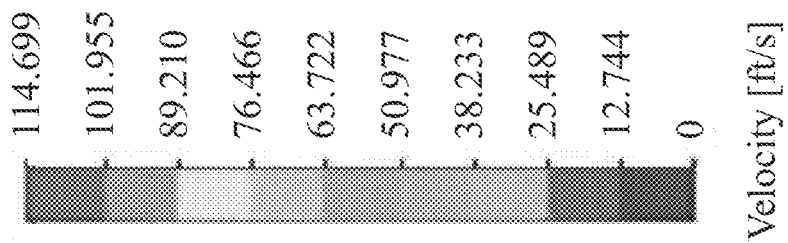
FIG. 12 illustrates the legend of the CFD representation of FIG. 10 in grayscale.

FIG. 9D illustrates an example of the use of both the drag reduction unit 130 and wake diverter 140 with the fan assembly 110. The drag reduction unit 130 is placed adjacent to and downstream of the motor 113. The wake diverter 140 is located adjacent to and downstream of the drag reduction unit 130. The wake diverter 140 is located along the periphery. As shown, although the area directly downstream of the motor 113 and drag reduction unit 130 is the slowest, the recovery length $L_D$ extends for only approximately 0.1 ft and begins to recover speed and/or laminar flow before entering the heater assembly 150.

As discussed above, the drag reduction unit 130 and the wake diverter 140 can be configured to allow air from an upstream component (e.g., the fan assembly 110) to recover speed and/or laminar flow in a short distance, such as less than or equal to about 12 inches. This can significantly reduce the size of environmental control systems by reducing the dead space and/or length of tubing required for air flow to recover a substantially laminar characteristic. In fields such as the aerospace industry, where environmental control systems may be installed in cramped aircrafts, the safe reduction of size of the environmental control system (e.g., a heating system) can be desirable.

In various implementations, the drag reduction unit 130 can be configured to redirect a central portion of the airflow exiting the fan assembly 110 and/or the wake diverter 140 can be configured to redirect a peripheral portion of the airflow exiting the fan assembly 110. In some embodiments, the drag reduction unit 130 and the wake diverter 140 can cooperate and/or interact to provide a desirable downstream flow of air, such as substantially laminar flow and/or a flow volume that is substantially constant across the cross-section of the inlet of the heating assembly. This can increase the efficiency of the system and/or can reduce the chance of heating elements being damaged due to insufficient and/or improper airflow.

The connection unit 120 can be configured to have minimal impact on airflow rate and/or volume. For example, the change in airflow rate and/or volume with and without the connection unit 120 can be less than or equal to 1%. In various embodiments, the connection unit 120 reduced the operational length of the environmental control system by less than about: 5%, 3%, 1%, 0.5%, or otherwise.

Certain Terminology

Terms of orientation used herein, such as "top," "bottom," "horizontal," "vertical," "longitudinal," "lateral," and "end" are used in the context of the illustrated embodiment. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular" or "cylindrical" or "semi-circular" or "semi-cylindrical" or any related or similar terms, are not required to conform strictly to the mathematical definitions of circles or cylinders or other structures, but can encompass structures that are reasonably close approximations.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may dictate, the term "generally parallel" can refer to something that departs from exactly parallel by less than or equal to 20 degrees.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

SUMMARY

Although various connection units have been disclosed in the context of certain embodiments and examples (e.g., fan and heating assemblies), this disclosure extends beyond the specifically disclosed embodiments to other alternative embodiments and/or uses of the embodiments and certain modifications and equivalents thereof. For example, although the discussion above is largely in connection with heating assemblies, the connection unit can be used with other components, such cooling assemblies (e.g., air conditioning units). Any of the features and aspects of the disclosed embodiments can be combined with or substituted for one another in order to form varying modes of the conveyor. The scope of this disclosure should not be limited by the particular disclosed embodiments described herein.

Certain features that are described in this disclosure in the context of separate implementations can also be implemented in combination in a single implementation. Conversely, various features that are described in the context of a single implementation can also be implemented in multiple implementations separately or in any suitable subcombination. Although features may be described above as acting in certain combinations, one or more features from a claimed combination can, in some cases, be excised from the combination, and the combination may be claimed as any subcombination or variation of any subcombination.

Moreover, while operations may be depicted in the drawings or described in the specification in a particular order, such operations need not be performed in the particular order shown or in sequential order, and all operations need not be performed, to achieve the desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Some embodiments have been described in connection with the accompanying figures. The figures are drawn and/or shown to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

In summary, various embodiments and examples of connection units have been disclosed. Although the units have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Thus, the scope of this disclosure should not be limited by the particular disclosed embodiments described above, but should be determined only by a fair reading of the claims that follow.

The following is claimed:

1. A connection unit comprising:
   an outer duct comprising an outer wall and a passage, the outer duct configured to convey a flow of air through the passage;
   a support coupled with the outer wall;
   a drag reduction unit coupled with the support and positioned in the passage, the drag reduction unit comprising an upstream end and a downstream end, the upstream end configured to be positioned adjacent to a fan motor; the downstream end comprising a convex curved surface that is configured to direct a first portion of the flow of air from a periphery of the passage toward a radial center of the passage; and a wake diverting component that protrudes radially inwardly from the outer wall, the wake diverting component positioned downstream of the drag reduction unit, the wake diverting component comprising:

a leading edge configured to direct a second portion of the flow of air from the periphery of the passage toward the radial center of the passage; and a trailing edge configured to direct a third portion of the flow of air toward the periphery of the connection unit;

wherein the support includes a plurality of support structures each coupled to the outer wall and to the drag reduction unit and configured as vanes for straightening the flow of air through the passage.

2. The connection unit of claim 1, wherein the outer duct comprises a hollow cylinder.

3. The connection unit of claim 1, wherein the convex curved surface comprises a generally hemispherical surface.

4. The connection unit of claim 1, wherein the drag reduction unit is radially centered within the connection unit.

5. The connection unit of claim 1, wherein the wake diverting component is integral with the outer wall.

6. The connection unit of claim 5, wherein the leading edge comprises a convex curve and the trailing edge is generally straight.

7. The connection unit of claim 1, wherein the connection unit is formed from a first connector portion and a second connector portion that are separable from each other.

8. The connection unit of claim 7, wherein the first connector portion and the second connector portion are configured to matingly engage.

9. The connection unit of claim 1, wherein a ratio of a length of the outer duct and a length of the drag reduction unit is at least one of 4:1, 3.9:1, 3.8:1, 3.7:1, 3.6:1, 3.5:1, 3.4:1, 3.3:1, 3.2:1, 3.1:1, and 3:1.

10. The connection unit of claim 1, wherein a downstream end of the connection unit comprises an indentation extending substantially around the periphery of the passage at the downstream end of the connection unit, wherein the indentation is configured to engage and secure a downstream component.

11. The connection unit of claim 10, wherein the downstream unit comprises a heater assembly.

12. The connection unit of claim 1, wherein an upstream end of the connection unit comprises a slot extending substantially around the periphery of the passage at the upstream end of the connection unit, wherein the slot is configured to engage and secure an upstream component.

13. The connection unit of claim 12, wherein the upstream unit comprises a fan assembly.

14. The connection unit of claim 1, wherein an upstream end of the connection unit is configured to engage with an upstream component and a downstream end of the connection unit is configured to engage with a downstream component, wherein the upstream component and the downstream component have dissimilar diameters.

15. The connection unit of claim 1, wherein at least portion of the connection unit comprises at least one of plastic, fire retardant nylon, PEEK, and ABS.

16. The connection unit of claim 1, wherein the outer duct comprises a first portion and a second portion, wherein the first portion comprises a first pair of engagement portions that are configured to engage with a second pair of engagement portions of the second portion.

17. The connection unit of claim 16, wherein the first pair of engagement portions and the second pair of engagement portions include a plurality of fastener openings that are configured to receive a fastener.

18. The connection unit of claim 17, wherein the fastener is at least one of a captured or quick release fastener.

19. The connection unit of claim 1, wherein the first portion and the second portion are symmetrical.

* * * * *